(12) United States Patent
Ma et al.

(10) Patent No.: US 10,397,853 B2
(45) Date of Patent: Aug. 27, 2019

(54) METHOD, APPARATUS AND SYSTEM FOR CONFIGURING SEARCH SPACE

(71) Applicant: HUAWEI TECHNOLOGIES CO., LTD., Shenzhen (CN)

(72) Inventors: Sha Ma, Beijing (CN); Chaojun Li, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 608 days.

(21) Appl. No.: 15/077,366

(22) Filed: Mar. 22, 2016

(65) Prior Publication Data

US 2016/0205614 A1 Jul. 14, 2016

Related U.S. Application Data

(63) Continuation of application No. PCT/CN2013/084019, filed on Sep. 23, 2013.

(51) Int. Cl.
*H04W 48/12* (2009.01)
*H04J 11/00* (2006.01)
(Continued)

(52) U.S. Cl.
CPC ......... *H04W 48/12* (2013.01); *H04J 11/0086* (2013.01); *H04L 5/005* (2013.01); *H04L 5/0053* (2013.01); *H04W 72/042* (2013.01)

(58) Field of Classification Search
CPC .. H04W 48/12; H04W 72/042; H04L 5/0005; H04J 11/0086
See application file for complete search history.

(56) References Cited

U.S. PATENT DOCUMENTS

2012/0063401 A1* 3/2012 Xue ................. H04L 5/001
370/329
2013/0121295 A1 5/2013 Saito et al.
(Continued)

FOREIGN PATENT DOCUMENTS

CN 101925109 A 12/2010
CN 102202324 A 9/2011
(Continued)

OTHER PUBLICATIONS

Extended European Search Report dated Sep. 21, 2016 in corresponding European Patent Application No. 13893996.2.
(Continued)

*Primary Examiner* — Rasheed Gidado
(74) *Attorney, Agent, or Firm* — Staas & Halsey LLP

(57) ABSTRACT

Embodiments of the present invention relate to the communications field, and provide a method, an apparatus, and a system for configuring a search space, to implement that a PDCCH carrying uplink-downlink configuration information can be sent normally, so that user equipment UE can receive uplink-downlink configuration information of a base station in time, thereby ensuring that the UE can complete data transmission according to the uplink-downlink configuration information, and improving user experience. The method includes: configuring, by a base station, a first subframe set, where a subframe in the first subframe set is a downlink subframe or a special subframe; configuring, by the base station, a first common search space CSS in the subframe in the first subframe set; and sending, by the base station to user equipment UE, a physical downlink control channel PDCCH carrying uplink-downlink configuration information, where the PDCCH is a PDCCH in the first CSS.

12 Claims, 4 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2013/0250880 A1* | 9/2013 | Liao | H04W 72/042 370/329 |
| 2014/0029486 A1 | 1/2014 | Li et al. | |
| 2014/0050191 A1 | 2/2014 | Kim et al. | |
| 2014/0177485 A1* | 6/2014 | Wang | H04L 1/00 370/280 |
| 2014/0177492 A1 | 6/2014 | Sun et al. | |
| 2014/0177556 A1* | 6/2014 | Pan | H04L 5/0053 370/329 |
| 2015/0029910 A1* | 1/2015 | He | H04W 4/70 370/280 |
| 2015/0110055 A1* | 4/2015 | Lv | H04W 48/12 370/329 |
| 2015/0312936 A1* | 10/2015 | Nguyen | H04L 1/0061 370/280 |
| 2015/0327225 A1* | 11/2015 | Xia | H04W 28/06 370/329 |
| 2016/0037492 A1* | 2/2016 | Xu | H04L 5/14 370/280 |

FOREIGN PATENT DOCUMENTS

| | | |
|---|---|---|
| CN | 102740477 A | 10/2012 |
| CN | 102883436 A | 1/2013 |
| CN | 102958058 A | 3/2013 |
| EP | 2 490 496 A1 | 8/2012 |
| WO | 2012/150822 A2 | 11/2012 |

OTHER PUBLICATIONS

International Search Report dated Jun. 25, 2014 in corresponding International Patent Application No. PCT/CN2013/084019.
Office Action dated Jul. 24, 2018 in corresponding Chinese Patent Application No. 201380019208.1, 6 pgs.
International Search Report dated Jun. 25, 2014 in corresponding International Application No. PCT/CN2013/084019.

* cited by examiner

METHOD, APPARATUS AND SYSTEM FOR CONFIGURING SEARCH SPACE

CROSS REFERENCE

This application is a continuation of International Application No. PCT/CN2013/084019, filed on Sep. 23, 2013 which is incorporated herein by references in its entirety.

TECHNICAL FIELD

The present invention relates to the communications field, and in particular, to a method, an apparatus, and a system for configuring a search space.

BACKGROUND

In an LTE (Long Term Evolution) system, a base station sends, to each UE (User Equipment), PDCCHs (Physical Downlink Control Channel) carrying various DCI (Downlink Control Information, uplink/downlink control information), and therefore, the UE needs to detect the PDCCHs, and acquire the various DCI carried by the PDCCHs. One PDCCH includes L consecutive CCEs (Control Channel Element) that are aggregated together. A search space is a set of PDCCHs to be detected by UE, and the search space includes two types: a CSS (Common Search Space) and a UESS (UE Specific Search Space). The CSS is a search space that multiple UEs in a cell need to listen on, and the UESS is a search space that a particular UE in a cell needs to listen on.

In an LTE TDD (Time Division Duplexing) system, a base station may dynamically configure a TDD uplink-downlink configuration, for example, change the uplink-downlink configuration at intervals of 10 ms to 40 ms. In this case, the base station needs to continually send, to UE, a PDCCH carrying uplink-downlink configuration information, where the PDCCH carrying uplink-downlink configuration information is located in the CSS. However, the CSS in an existing system has a limited size, and if multiple types of DCI need to be carried by PDCCHs in the CSS at a same moment, the base station may fail to find an idle PDCCH in the CSS to carry and send the uplink-downlink configuration information, and consequently, the UE cannot acquire current uplink-downlink configuration information, and the UE may fail to send and receive data normally.

SUMMARY

Embodiments of the present invention provide a method, an apparatus, and a system for configuring a search space, to ensure that a PDCCH carrying uplink-downlink configuration information can be sent normally, so that UE can acquire uplink-downlink configuration information of a base station in time, thereby ensuring that the UE completes data transmission according to the uplink-downlink configuration information.

To achieve the foregoing objective, the following technical solutions are used in embodiments of the present invention:

According to a first aspect, an embodiment of the present invention provides a method for configuring a search space, including: configuring, by a base station, a first subframe set, where a subframe in the first subframe set is a downlink subframe or a special subframe: configuring, by the base station, a first common search space CSS in the subframe in the first subframe set, where the first CSS consists of L control channel elements CCEs in a control area, and L is a positive integer greater than 16; and sending, by the base station to user equipment UE, a physical downlink control channel PDCCH carrying uplink-downlink configuration information, where the PDCCH is a PDCCH in the first CSS.

In a first possible implementation manner of the first aspect, the first CSS includes a reference CSS and a newly added CSS, and the configuring a first CSS includes: configuring the reference CSS, where the reference CSS consists of the first 16 CCEs in the control area; and configuring the newly added CSS, where the newly added CSS consists of N CCEs in the control area, N is equal to L−16, and the N CCEs do not include the first 16 CCEs in the control area.

With reference to the first aspect, or the first possible implementation manner of the first aspect, in a second possible implementation manner of the first aspect, after the determining, by a base station, a first subframe set, the method further includes: sending, by the base station, first signaling to the UE, where the first signaling carries configuration information of the first subframe set.

With reference to the second possible implementation manner of the first aspect, in a third possible implementation manner of the first aspect, the configuration information of the first subframe set includes an allocation period M and a subframe offset $n_{OFFSET}$, and the configuring, by a base station, a first subframe set includes: configuring, by the base station, the first subframe set according to the allocation period M and the subframe offset $n_{OFFSET}$, where the subframe in the first subframe set satisfies: $(10 \times n_f + n_{sbf} - n_{OFFSET}) \bmod M = 0$, where $n_f$ represents a system frame number SFN, and $n_{sbf}$ represents a subframe number.

With reference to the first aspect, or any one of the first to third possible implementation manners of the first aspect, in a fourth possible implementation manner of the first aspect, the configuring the first CSS includes: configuring, by the base station, the first CSS according to a first preset rule, where the first preset rule is used to indicate a size and a location of the first CSS.

With reference to the fourth possible implementation manner of the first aspect, in a fifth possible implementation manner of the first aspect, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

With reference to the first aspect, or any one of the first to third possible implementation manners of the first aspect, in a sixth possible implementation manner of the first aspect, after the configuring the first CSS, the method further includes: sending, by the base station, second signaling to the UE, where the second signaling is used to indicate a size of the first CSS and/or a location of the first CSS.

With reference to any one of the first to third possible implementation manners of the first aspect, in a seventh possible implementation manner of the first aspect, the configuring the newly added CSS includes: configuring, by the base station, the newly added CSS according to a second preset rule, where the second preset rule is used to indicate a size and a location of the newly added CSS.

With reference to the seventh possible implementation manner of the first aspect, in an eighth possible implementation manner of the first aspect, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

With reference to any one of the first to third possible implementation manners of the first aspect, in a ninth possible implementation manner of the first aspect, after the configuring the newly added CSS, the method further includes: sending, by the base station, third signaling to the UE, where the third signaling is used to indicate a size of the newly added CSS and/or a location of the newly added CSS.

With reference to any one of the first to third or seventh to ninth possible implementation manners of the first aspect, in a tenth possible implementation manner of the first aspect, before the sending, by the base station to the UE, the PDCCH carrying uplink-downlink configuration information, the method further includes: determining, by the base station, the PDCCH for carrying the uplink-downlink configuration information, where the determining, by the base station, the PDCCH for carrying the uplink-downlink configuration information includes: determining, by the base station, whether the reference CSS includes an idle PDCCH, where the idle PDCCH is a PDCCH that does not carry downlink control information DCI; and if the base station determines that the reference CSS includes an idle PDCCH, determining that the PDCCH for carrying the uplink-downlink configuration information is the idle PDCCH; or if the base station determines that the reference CSS does not include an idle PDCCH, determining that the PDCCH for carrying the uplink-downlink configuration information is a PDCCH in the newly added CSS.

With reference to the first aspect, or any one of the first to tenth possible implementation manners of the first aspect, in an eleventh possible implementation manner of the first aspect, the base station configures a first user specific search space UESS in the subframe in the first subframe set.

With reference to the eleventh possible implementation manner of the first aspect, in a twelfth possible implementation manner of the first aspect, the base station configures the first UESS according to a third preset rule or a maximum quantity of times of PDCCH blind detection of the UE, where the third preset rule is used to indicate a size and a location of the first UESS.

With reference to the twelfth possible implementation manner of the first aspect, in a thirteenth possible implementation manner of the first aspect, the configuring a first UESS includes: when the PDCCH carrying the uplink-downlink configuration information is the idle PDCCH in the reference CSS, configuring that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; when the PDCCH for carrying the uplink-downlink configuration information is the PDCCH in the newly added CSS, configuring the first UESS according to the third preset rule; or when the PDCCH carrying the uplink-downlink configuration information is the PDCCH in the newly added CSS, configuring the first UESS according to the maximum quantity of times of PDCCH blind detection of the UE.

With reference to the twelfth or thirteenth possible implementation manner of the first aspect, in a fourteenth possible implementation manner of the first aspect, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

With reference to the eleventh possible implementation manner of the first aspect, in a fifteenth possible implementation manner of the first aspect, after the configuring, by the base station, the first UESS, the method further includes: sending, by the base station, fourth signaling to the UE, where the fourth signaling is used to indicate a size of the first UESS and/or a location of the first UESS.

According to a second aspect, an embodiment of the present invention provides a method for configuring a search space, including: determining, by user equipment UE, a first subframe set, where a subframe in the first subframe set is a downlink subframe or a special subframe; determining, by the UE, a first common search space CSS in the subframe in the first subframe set, where the first CSS consists of L control channel elements CCEs in a control area, and L is a positive integer greater than 16; and detecting, by the UE in the first CSS, a physical downlink control channel PDCCH carrying uplink-downlink configuration information.

In a first possible implementation manner of the second aspect, the first CSS includes a reference CSS and a newly added CSS, and the determining a first CSS includes: determining the reference CSS, where the reference CSS consists of the first 16 CCEs in the control area; and determining the newly added CSS, where the newly added CSS consists of N CCEs in the control area, N is equal to L−16, and the N CCEs do not include the first 16 CCEs in the control area.

With reference to the second aspect, or the first possible implementation manner of the second aspect, in a second possible implementation manner of the second aspect, the determining, by UE, a first subframe set includes: receiving first signaling sent by a base station, where the first signaling carries configuration information of the first subframe set; and determining, by the UE, the first subframe set according to the first signaling.

With reference to the second possible implementation manner of the second aspect, in a third possible implementation manner of the second aspect, the configuration information of the first subframe set includes an allocation period and a subframe offset, and the determining, by the UE, the first subframe set according to the first signaling includes: determining, by the UE, the first subframe set according to the allocation period M and the subframe offset $n_{OFFSET}$, where the subframe in the first subframe set satisfies: $(10 \times n_f + n_{sbf} - n_{OFFSET}) \bmod M = 0$, where $n_f$ represents a system frame number SFN, and $n_{sbf}$ represents a subframe number.

With reference to the second aspect, or any one of the first to third possible implementation manners of the second aspect, in a fourth possible implementation manner of the second aspect, the determining, by the UE, the first CSS includes: determining, by the UE, the first CSS according to a first preset rule, where the first preset rule is used to indicate a size and a location of the first CSS.

With reference to the fourth possible implementation manner of the second aspect, in a fifth possible implementation manner of the second aspect, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

With reference to the second aspect, or any one of the first to third possible implementation manners of the second aspect, in a sixth possible implementation manner of the second aspect, the determining, by the UE, the first CSS includes: receiving, by the UE, second signaling sent by the base station, where the second signaling is used to indicate a size of the first CSS and/or a location of the first CSS; and determining, by the UE, the first CSS according to the second signaling.

With reference to any one of the first to third possible implementation manners of the second aspect, in a seventh possible implementation manner of the second aspect, the determining the newly added CSS includes: determining, by the UE, the newly added CSS according to a second preset rule, where the second preset rule is used to indicate a size and a location of the newly added CSS.

With reference to the seventh possible implementation manner of the second aspect, in an eighth possible implementation manner of the second aspect, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

With reference to any one of the first to third possible implementation manners of the second aspect, in a ninth possible implementation manner of the second aspect, the determining the newly added CSS includes: receiving third signaling sent by the base station, where the third signaling is used to indicate a size of the newly added CSS and/or a location of the newly added CSS; and determining, by the UE, the newly added CSS according to the third signaling.

With reference to any one of the first to third, or seventh to ninth possible implementation manners of the second aspect, in a tenth possible implementation manner of the second aspect, the detecting, by the UE in the first CSS, a PDCCH carrying uplink-downlink configuration information includes: first detecting, by the UE in the reference CSS, the PDCCH carrying the uplink-downlink configuration information, and determining whether the reference CSS includes the PDCCH carrying the uplink-downlink configuration information; and if the UE determines that the reference CSS includes the PDCCH carrying the uplink-downlink configuration information, skipping detecting, in the newly added CSS, the PDCCH carrying the uplink-downlink configuration information; or if the UE determines that the reference CSS does not include the PDCCH carrying the uplink-downlink configuration information, detecting, by the UE in the newly added CSS, the PDCCH carrying the uplink-downlink configuration information.

With reference to the second aspect, or any one of the first to tenth possible implementation manners of the second aspect, in an eleventh possible implementation manner of the second aspect, the UE determines the first UESS in the subframe in the first subframe set.

With reference to the eleventh possible implementation manner of the second aspect, in a twelfth possible implementation manner of the second aspect, the determining the first UESS includes: determining, by the UE, the first UESS according to the third preset rule or a maximum quantity of times of PDCCH blind detection of the UE, where the third preset rule is used to indicate a size and a location of the first UESS.

With reference to the eleventh possible implementation manner of the second aspect, in a thirteenth possible implementation manner of the second aspect, the determining the first UESS includes: if the UE determines that the reference CSS includes the PDCCH carrying the uplink-downlink configuration information, determining that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; if the UE determines that the reference CSS does not include the PDCCH carrying the uplink-downlink configuration information, determining the first UESS according to the third preset rule; or if the UE determines that the reference CSS does not include the PDCCH carrying the uplink-downlink configuration information, configuring the first UESS according to the maximum quantity of times of PDCCH blind detection of the UE.

With reference to the twelfth or thirteenth possible implementation manner of the second aspect, in a fourteenth possible implementation manner of the second aspect, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

With reference to the eleventh possible implementation manner of the second aspect, in a fifteenth possible implementation manner of the second aspect, the determining, by the UE, the first UESS includes: receiving, by the UE, fourth signaling, where the fourth signaling is used to indicate a size of the first UESS and/or a location of the first UESS; and determining, by the UE, the first UESS according to the fourth signaling.

According to a third aspect, an embodiment of the present invention provides a base station, including: a configuration unit, configured to configure a first subframe set, where a subframe in the first subframe set is a downlink subframe or a special subframe, where the configuration unit is further configured to configure a first common search space CSS in the subframe in the first subframe set, where the first CSS consists of L control channel elements CCEs in a control area, and L is a positive integer greater than 16; and a sending unit, configured to send, to user equipment UE, a physical downlink control channel PDCCH carrying uplink-downlink configuration information, where the PDCCH is a PDCCH in the first CSS.

In a first possible implementation manner of the third aspect, the first CSS includes a reference CSS and a newly added CSS, and the configuration unit is specifically configured to configure the reference CSS, where the reference CSS consists of the first 16 CCEs in the control area: and configure the newly added CSS, where the newly added CSS consists of N CCEs in the control area, N is equal to L−16, and the N CCEs do not include the first 16 CCEs in the control area.

With reference to the third aspect, or the first possible implementation manner of the third aspect, in a second possible implementation manner of the third aspect, the sending unit is further configured to send first signaling to the UE, where the first signaling carries configuration information of the first subframe set.

With reference to the second possible implementation manner of the third aspect, in a third possible implementation manner of the third aspect, the configuration information of the first subframe set includes an allocation period M and a subframe offset $n_{OFFSET}$, and the configuration unit is specifically configured to configure the first subframe set according to the allocation period M and the subframe offset $n_{OFFSET}$, where the subframe in the first subframe set satisfies: $(10 \times n_f + n_{sbf} - n_{OFFSET}) \bmod M = 0$, where $n_f$ represents a system frame number SFN, and $n_{sbf}$ represents a subframe number.

With reference to the third aspect, or any one of the first to third possible implementation manners of the third aspect, in a fourth possible implementation manner of the third aspect, the configuration unit is specifically configured to configure the first CSS according to a first preset rule, where the first preset rule is used to indicate a size and a location of the first CSS.

With reference to the fourth possible implementation manner of the third aspect, in a fifth possible implementation manner of the third aspect, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

With reference to the third aspect, or any one of the first to third possible implementation manners of the third aspect, in a sixth possible implementation manner of the third aspect, the sending unit is further configured to send second signaling to the UE, where the second signaling is used to indicate a size of the first CSS and/or a location of the first CSS.

With reference to any one of the first to third possible implementation manners of the third aspect, in a seventh possible implementation manner of the third aspect, the configuration unit is specifically configured to configure the newly added CSS according to a second preset rule, where the second preset rule is used to indicate a size and a location of the newly added CSS.

With reference to the seventh possible implementation manner of the third aspect, in an eighth possible implementation manner of the third aspect, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

With reference to any one of the first to third possible implementation manners of the third aspect, in a ninth possible implementation manner of the third aspect, the sending unit is further configured to send third signaling to the UE, where the third signaling is used to indicate a size of the newly added CSS and/or a location of the newly added CSS.

With reference to any one of the first to third or sixth to eighth possible implementation manners of the third aspect, in a tenth possible implementation manner of the third aspect, the base station further includes a determining unit, where the determining unit is configured to determine the PDCCH for carrying the uplink-downlink configuration information, and specifically configured to: determine whether the reference CSS includes an idle PDCCH, where the idle PDCCH is a PDCCH that does not carry downlink control information DCI; and if it is determined that the reference CSS includes an idle PDCCH, determine that the PDCCH for carrying the uplink-downlink configuration information is the idle PDCCH; or if it is determined that the reference CSS does not include an idle PDCCH, determine that the PDCCH for carrying the uplink-downlink configuration information is a PDCCH in the newly added CSS.

With reference to the third aspect, or any one of the first to tenth possible implementation manners of the third aspect, in an eleventh possible implementation manner of the third aspect, the configuration unit is further configured to configure a first user specific search space UESS in the subframe in the first subframe set.

With reference to the eleventh possible implementation manner of the third aspect, in a twelfth possible implementation manner of the third aspect, the configuration unit is specifically configured to configure the first UESS according to a third preset rule or a maximum quantity of times of PDCCH blind detection of the UE, where the third preset rule is used to indicate a size and a location of the first UESS.

With reference to the twelfth possible implementation manner of the third aspect, in a thirteenth possible implementation manner of the third aspect, the configuration unit is specifically configured to: when the PDCCH carrying the uplink-downlink configuration information is the idle PDCCH in the reference CSS, configure that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; when the PDCCH carrying the uplink-downlink configuration information is the PDCCH in the newly added CSS, configure the first UESS according to the third preset rule; or when the PDCCH carrying the uplink-downlink configuration information is the PDCCH in the newly added CSS, configure the first UESS according to the maximum quantity of times of PDCCH blind detection of the UE.

With reference to the twelfth or thirteenth possible implementation manner of the third aspect, in a fourteenth possible implementation manner of the third aspect, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8;

or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

With reference to the eleventh possible implementation manner of the third aspect, in a fifteenth possible implementation manner of the third aspect, the sending unit is further configured to send fourth signaling to the UE, where the fourth signaling is used to indicate a size of the first UESS and/or a location of the first UESS.

According to a fourth aspect, an embodiment of the present invention provides user equipment UE, including: a determining unit, configured to determine a first subframe set, where a subframe in the first subframe set is a downlink subframe or a special subframe, where the determining unit is further configured to determine a first common search space CSS in the subframe in the first subframe set, where the first CSS consists of L control channel elements CCEs in a control area, and L is a positive integer greater than 16; and a detection unit, configured to detect, in the first CSS, a physical downlink control channel PDCCH carrying uplink-downlink configuration information.

In a first possible implementation manner of the fourth aspect, the first CSS includes a reference CSS and a newly added CSS, and the determining unit is specifically configured to determine the reference CSS, where the reference CSS consists of the first 16 CCEs in the control area; and determine the newly added CSS, where the newly added CSS consists of N CCEs in the control area, N is equal to L−16, and the N CCEs do not include the first 16 CCEs in the control area.

With reference to the fourth aspect, or the first possible implementation manner of the fourth aspect, in a second possible implementation manner of the fourth aspect, the UE further includes: a first receiving unit, configured to receive first signaling sent by a base station, where the first signaling carries configuration information of the first subframe set; and the determining unit is specifically configured to determine the first subframe set according to the first signaling received by the receiving unit.

With reference to the second possible implementation manner of the fourth aspect, in a third possible implementation manner of the fourth aspect, the configuration information of the first subframe set includes an allocation period and a subframe offset, and the determining unit is specifically configured to determine the first subframe set according to the allocation period M and the subframe offset $n_{OFFSET}$, where the subframe in the first subframe set satisfies: $(10 \times n_f + n_{sbf} - n_{OFFSET}) \bmod M = 0$, where $n_f$ represents a system frame number SFN, and $n_{sbf}$ represents a subframe number.

With reference to the fourth aspect, or any one of the first to third possible implementation manners of the fourth aspect, in a fourth possible implementation manner of the fourth aspect, the determining unit is specifically configured to determine the first CSS according to a first preset rule, where the first preset rule is used to indicate a size and a location of the first CSS.

With reference to the fourth possible implementation manner of the fourth aspect, in a fifth possible implementation manner of the fourth aspect, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

With reference to the fourth aspect, or any one of the first to third possible implementation manners of the fourth aspect, in a sixth possible implementation manner of the fourth aspect, the UE further includes a second receiving unit, configured to receive second signaling sent by the base station, where the second signaling is used to indicate a size of the first CSS and/or a location of the first CSS; and the determining unit is specifically configured to determine the first CSS according to the second signaling received by the second receiving unit.

With reference to any one of the first to third possible implementation manners of the fourth aspect, in a seventh possible implementation manner of the fourth aspect, the determining unit is specifically configured to determine the newly added CSS according to a second preset rule, where the second preset rule is used to indicate a size and a location of the newly added CSS.

With reference to the seventh possible implementation manner of the fourth aspect, in an eighth possible implementation manner of the fourth aspect, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

With reference to any one of the first to third possible implementation manners of the fourth aspect, in a ninth possible implementation manner of the fourth aspect, the UE further includes a third receiving unit, configured to receive third signaling sent by the base station, where the third signaling is used to indicate a size of the newly added CSS and/or a location of the newly added CSS; and the determining unit is specifically configured to determine the newly added CSS according to the third signaling received by the third receiving unit.

With reference to any one of the first to third or seventh to ninth possible implementation manners of the fourth aspect, in a tenth possible implementation manner of the fourth aspect, the detection unit is specifically configured to first detect, in the reference CSS, the PDCCH carrying the uplink-downlink configuration information, and determine whether the reference CSS includes the PDCCH carrying the uplink-downlink configuration information; and if it is determined that the reference CSS includes the PDCCH carrying the uplink-downlink configuration information, skip detecting, in the newly added CSS, the PDCCH carrying the uplink-downlink configuration information; or if it is determined that the reference CSS does not include the PDCCH carrying the uplink-downlink configuration information, detect, in the newly added CSS, the PDCCH carrying the uplink-downlink configuration information.

With reference to the fourth aspect, or any one of the first to tenth possible implementation manners of the fourth aspect, in an eleventh possible implementation manner of the fourth aspect, the determining unit is further configured to determine the first UESS in the subframe in the first subframe set.

With reference to the eleventh possible implementation manner of the fourth aspect, in a twelfth possible implementation manner of the fourth aspect, the determining unit is specifically configured to determine the first UESS according to the third preset rule or a maximum quantity of times of PDCCH blind detection of the UE, where the third preset rule is used to indicate a size and a location of the first UESS.

With reference to the twelfth possible implementation manner of the fourth aspect, in a thirteenth possible implementation manner of the fourth aspect, the determining unit is specifically configured to: if it is determined that the reference CSS includes the PDCCH carrying the uplink-downlink configuration information, determine that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; if it determined that the reference CSS does not include the PDCCH carrying the uplink-downlink configuration information, determine the first UESS according to the third preset rule; or if it is determined that the reference CSS does not include the PDCCH carrying the uplink-downlink configuration information, configure the first UESS according to the maximum quantity of times of PDCCH blind detection of the UE.

With reference to the twelfth or thirteenth possible implementation manner of the fourth aspect, in a fourteenth possible implementation manner of the fourth aspect, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

With reference to the eleventh possible implementation manner of the fourth aspect, in a fifteenth possible implementation manner of the fourth aspect, the UE further includes a fourth receiving unit, configured to receive fourth signaling, where the fourth signaling is used to indicate a size of the first UESS and/or a location of the first UESS; and the determining unit is specifically configured to determine the first UESS according to the fourth signaling received by the fourth receiving unit.

According to a fifth aspect, an embodiment of the present invention provides a base station, including: a processor, configured to configure a first subframe set, where a subframe in the first subframe set is a downlink subframe or a special subframe, where the processor is further configured to configure a first common search space CSS in the subframe in the first subframe set, where the first CSS consists of L control channel elements CCEs in a control area, and L is a positive integer greater than 16; and a transmitter, configured to send, to user equipment UE, a physical downlink control channel PDCCH carrying uplink-downlink configuration information, where the PDCCH is a PDCCH in the first CSS.

In a first possible implementation manner of the fifth aspect, the first CSS includes a reference CSS and a newly added CSS, and the processor is specifically configured to configure the reference CSS, where the reference CSS consists of the first 16 CCEs in the control area; and configure the newly added CSS, where the newly added CSS consists of N CCEs in the control area, N is equal to L−16, and the N CCEs do not include the first 16 CCEs in the control area.

With reference to the fifth aspect, or the first possible implementation manner of the fifth aspect, in a second possible implementation manner of the fifth aspect, the transmitter is further configured to send first signaling to the UE, where the first signaling carries configuration information of the first subframe set.

With reference to the second possible implementation manner of the fifth aspect, in a third possible implementation manner of the fifth aspect, the configuration information of the first subframe set includes an allocation period M and a subframe offset $n_{OFFSET}$, and the processor is specifically configured to configure the first subframe set according to the allocation period M and the subframe offset $n_{OFFSET}$, where the subframe in the first subframe set satisfies: $(10 \times n_f + n_{sbf} - n_{OFFSET}) \mod M = 0$, where $n_f$ represents a system frame number SFN, and $n_{sbf}$ represents a subframe number.

With reference to the fifth aspect, or any one of the first to third possible implementation manners of the fifth aspect, in a fourth possible implementation manner of the fifth aspect, the processor is specifically configured to configure the first CSS according to a first preset rule, where the first preset rule is used to indicate a size and a location of the first CSS.

With reference to the fourth possible implementation manner of the fifth aspect, in a fifth possible implementation manner of the fifth aspect, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

With reference to the fifth aspect, or any one of the first to third possible implementation manners of the fifth aspect, in a sixth possible implementation manner of the fifth aspect, the transmitter is further configured to send second signaling to the UE, where the second signaling is used to indicate a size of the first CSS and/or a location of the first CSS.

With reference to any one of the first to third possible implementation manners of the fifth aspect, in a seventh possible implementation manner of the fifth aspect, the processor is specifically configured to configure the newly added CSS according to a second preset rule, where the second preset rule is used to indicate a size and a location of the newly added CSS.

With reference to the seventh possible implementation manner of the fifth aspect, in an eighth possible implementation manner of the fifth aspect, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

With reference to any one of the first to third possible implementation manners of the fifth aspect, in a ninth possible implementation manner of the fifth aspect, the transmitter is further configured to send third signaling to the UE, where the third signaling is used to indicate a size of the newly added CSS and/or a location of the newly added CSS.

With reference to any one of the first to third or sixth to eighth possible implementation manners of the fifth aspect, in a tenth possible implementation manner of the fifth aspect, the processor is further configured to determine the PDCCH for carrying the uplink-downlink configuration information, and specifically configured to: determine whether the reference CSS includes an idle PDCCH, where the idle PDCCH is a PDCCH that does not carry downlink control information DCI; and if it is determined that the reference CSS includes an idle PDCCH, determine that the PDCCH for carrying the uplink-downlink configuration information is the idle PDCCH; or if it is determined that the reference CSS does not include an idle PDCCH, determine that the PDCCH for carrying the uplink-downlink configuration information is a PDCCH in the newly added CSS.

With reference to the fifth aspect, or any one of the first to tenth possible implementation manners of the fifth aspect, in an eleventh possible implementation manner of the fifth aspect, the processor is further configured to configure a first user specific search space UESS in the subframe in the first subframe set.

With reference to the eleventh possible implementation manner of the fifth aspect, in a twelfth possible implementation manner of the fifth aspect, the processor is specifically configured to configure the first UESS according to a third preset rule or a maximum quantity of times of PDCCH blind detection of the UE, where the third preset rule is used to indicate a size and a location of the first UESS.

With reference to the twelfth possible implementation manner of the fifth aspect, in a thirteenth possible implementation manner of the fifth aspect, the processor is specifically configured to: when the PDCCH carrying the uplink-downlink configuration information is the idle PDCCH in the reference CSS, configure that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8: when the PDCCH carrying the uplink-downlink configuration information is the PDCCH in the newly added CSS, configure the first UESS according to the third preset rule; or when the PDCCH carrying the uplink-downlink configuration information is the PDCCH in the newly added CSS, configure the first UESS according to the maximum quantity of times of PDCCH blind detection of the UE.

With reference to the twelfth or thirteenth possible implementation manner of the fifth aspect, in a fourteenth possible implementation manner of the fifth aspect, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

With reference to the eleventh possible implementation manner of the fifth aspect, in a fifteenth possible implementation manner of the fifth aspect, the transmitter is further configured to send fourth signaling to the UE, where the fourth signaling is used to indicate a size of the first UESS and/or a location of the first UESS.

According to a sixth aspect, an embodiment of the present invention provides user equipment UE, including: a processor, configured to determine a first subframe set, where a subframe in the first subframe set is a downlink subframe or a special subframe, where the processor is further configured to determine a first common search space CSS in the subframe in the first subframe set, where the first CSS consists of L control channel elements CCEs in a control area, and L is a positive integer greater than 16; and the processor is further configured to detect, in the first CSS, a physical downlink control channel PDCCH carrying uplink-downlink configuration information.

In a first possible implementation manner of the sixth aspect, the first CSS includes a reference CSS and a newly added CSS, and the processor is specifically configured to determine the reference CSS, where the reference CSS consists of the first 16 CCEs in the control area; and determine the newly added CSS, where the newly added CSS consists of N CCEs in the control area, N is equal to L−16, and the N CCEs do not include the first 16 CCEs in the control area.

With reference to the sixth aspect, or the first possible implementation manner of the sixth aspect, in a second possible implementation manner of the sixth aspect, a receiver is configured to receive first signaling sent by a base station, where the first signaling carries configuration information of the first subframe set; and the processor is specifically configured to determine the first subframe set according to the first signaling received by the receiver.

With reference to the second possible implementation manner of the sixth aspect, in a third possible implementation manner of the sixth aspect, the configuration information of the first subframe set includes an allocation period and a subframe offset, and the processor is specifically configured to determine the first subframe set according to the allocation period M and the subframe offset $n_{OFFSET}$, where the subframe in the first subframe set satisfies: $(10 \times n_f + n_{sbf} - n_{OFFSET}) \mod M = 0$, where $n_f$ represents a system frame number SFN, and $n_{sbf}$ represents a subframe number.

With reference to the sixth aspect, or any one of the first to third possible implementation manners of the sixth aspect, in a fourth possible implementation manner of the sixth aspect, the processor is specifically configured to determine the first CSS according to a first preset rule, where the first preset rule is used to indicate a size and a location of the first CSS.

With reference to the fourth possible implementation manner of the sixth aspect, in a fifth possible implementation manner of the sixth aspect, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

With reference to the sixth aspect, or any one of the first to third possible implementation manners of the sixth aspect, in a sixth possible implementation manner of the sixth aspect, the receiver is further configured to receive second signaling sent by the base station, where the second signaling is used to indicate a size of the first CSS and/or a location of the first CSS; and the processor is specifically configured to determine the first CSS according to the second signaling received by the receiver.

With reference to any one of the first to third possible implementation manners of the sixth aspect, in a seventh possible implementation manner of the sixth aspect, the processor is specifically configured to determine the newly added CSS according to a second preset rule, where the second preset rule is used to indicate a size and a location of the newly added CSS.

With reference to the seventh possible implementation manner of the sixth aspect, in an eighth possible implementation manner of the sixth aspect, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

With reference to any one of the first to third possible implementation manners of the sixth aspect, in a ninth possible implementation manner of the sixth aspect, the receiver is further configured to receive third signaling sent by the base station, where the third signaling is used to indicate a size of the newly added CSS and/or a location of the newly added CSS; and the processor is specifically configured to determine the newly added CSS according to the third signaling received by the receiver.

With reference to any one of the first to third or seventh to ninth possible implementation manners of the sixth aspect, in a tenth possible implementation manner of the sixth aspect, the processor is specifically configured to first detect, in the reference CSS, the PDCCH carrying the uplink-downlink configuration information, and determine whether the reference CSS includes the PDCCH carrying the uplink-downlink configuration information; and if it is determined that the reference CSS includes the PDCCH carrying the uplink-downlink configuration information, skip detecting, in the newly added CSS, the PDCCH carrying the uplink-downlink configuration information; or if it is determined that the reference CSS does not include the PDCCH carrying the uplink-downlink configuration information, detect, in the newly added CSS, the PDCCH carrying the uplink-downlink configuration information.

With reference to the sixth aspect, or any one of the first to tenth possible implementation manners of the sixth aspect, in an eleventh possible implementation manner of the sixth aspect, the processor is further configured to determine the first UESS in the subframe in the first subframe set.

With reference to the eleventh possible implementation manner of the sixth aspect, in a twelfth possible implementation manner of the sixth aspect, the processor is specifically configured to determine the first UESS according to the third preset rule or a maximum quantity of times of PDCCH blind detection of the UE, where the third preset rule is used to indicate a size and a location of the first UESS.

With reference to the twelfth possible implementation manner of the sixth aspect, in a thirteenth possible implementation manner of the sixth aspect, the processor is specifically configured to: if it is determined that the reference CSS includes the PDCCH carrying the uplink-downlink configuration information, determine that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; if it determined that the reference CSS does not include the PDCCH carrying the uplink-downlink configuration information, determine the first UESS according to the third preset rule; or if it is determined that the reference CSS does not include the PDCCH carrying the uplink-downlink configuration information, configure the first UESS according to the maximum quantity of times of PDCCH blind detection of the UE.

With reference to the twelfth or thirteenth possible implementation manner of the sixth aspect, in a fourteenth possible implementation manner of the sixth aspect, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

With reference to the eleventh possible implementation manner of the sixth aspect, in a fifteenth possible implementation manner of the sixth aspect, the receiver is further configured to receive fourth signaling, where the fourth signaling is used to indicate a size of the first UESS and/or a location of the first UESS; and the processor is specifically configured to determine the first UESS according to the fourth signaling received by the receiver.

According to a seventh aspect, an embodiment of the present invention provides a system for configuring a search space, including: a base station and user equipment UE, where the base station is the base station according to the foregoing embodiments, and the UE is the UE according to the foregoing embodiments.

The embodiments of the present invention provide a method, an apparatus, and a system for configuring a search space. A base station configures a first CSS in a subframe in a first subframe set, determines, in the first CSS, a PDCCH for carrying uplink-downlink configuration information, and sends the PDCCH carrying the uplink-downlink configuration information. Because the first CSS is larger than a CSS specified in the prior art, a PDCCH for carrying uplink-downlink configuration information can surely be found, which ensures sending of the uplink-downlink configuration information, so that UE can acquire, in time, the uplink-downlink configuration information configured by the base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that, in all the embodiments of the present invention, a time domain in a communications system consists of radio frames, and each radio frame is identified by using an SFN (System Frame Number, system frame number) $n_f$, where the SFN is obtained by cyclically numbering the radio frames according to a period. For example, if 10 bits are used to identify the SFN, values of $n_f$ are consecutive integers from 0 to 1023; therefore, the radio frames are numbered from 0 to 1023 cyclically. Each radio frame consists of 10 subframes having a length of 1 ms, and the subframes in each radio frame are identified by using subframe numbers $n_{sbf}$, where values of $n_{sbf}$ are consecutive integers from 0 to 9. In other words, one subframe is identified by using a system frame number $n_f$ and a subframe number $n_{sbf}$ in each system frame/radio frame.

It should be noted that, in an existing system, a CSS (Common Search Space, common search space) is a set consisting of PDCCHs (Physical Downlink Control Channel, physical downlink control channel); a UESS (UE Specific Search Space, user equipment specific search space) may be a set consisting of candidate PDCCHs, or may be a set consisting of candidate ePDCCHs (enhanced Physical Downlink Control Channel, enhanced physical downlink control channel). In a future evolved system, the CSS may also be a set consisting of ePDCCHs. In the present invention, unless otherwise specified, an ePDCCH and a PDCCH are collectively referred to as a PDCCH, and a CCE (Control Channel Element, control channel element) and an eCCE (enhanced Control Channel Element, enhanced control channel element) are collectively referred to as a CCE.

Figure 1:
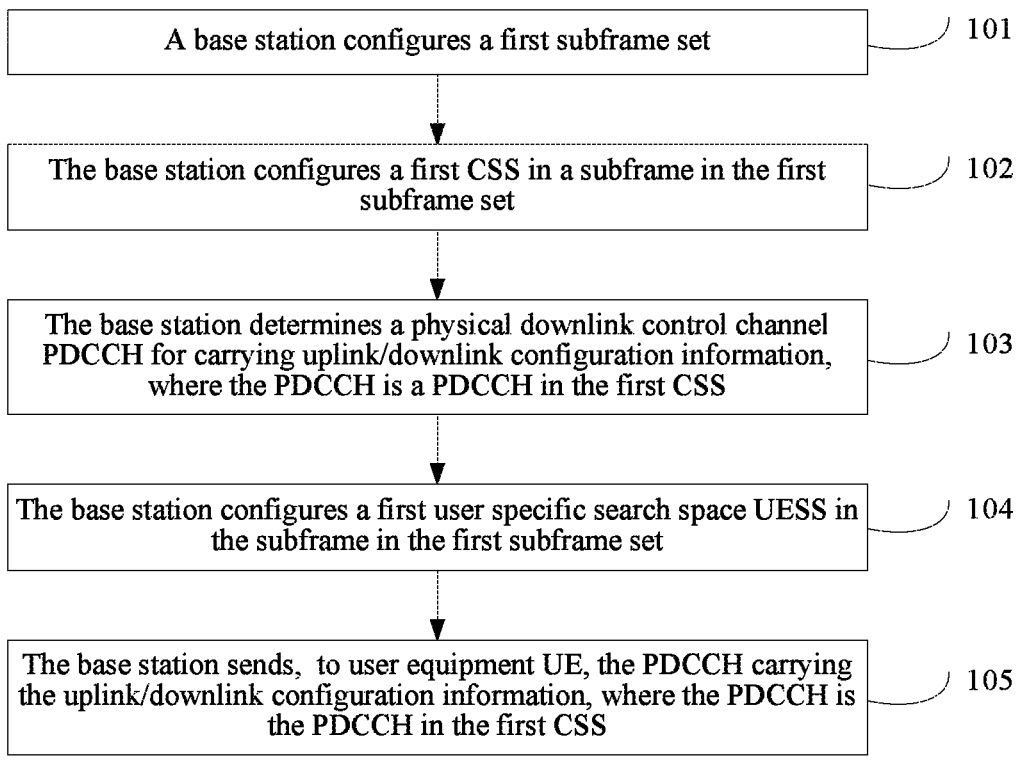
FIG. 1 is a schematic flowchart of a method for configuring a search space according to an embodiment of the present invention.

An embodiment of the present invention provides a method for configuring a search space. As shown in FIG. 1, the method includes:

101: A base station configures a first subframe set.

A subframe in the first subframe set is a downlink subframe or a special subframe (SF, Special Subframe).

Because a special subframe includes a DwPTS (downlink pilot time slot, Downlink Pilot Time Slot) that can be used for downlink data transmission, and a control area exists in the DwPTS, the subframe in the first subframe set may be a special subframe.

It should be noted that, the control area consists of a sequence of CCEs, and both a CSS and a UESS belong to the control area.

Preferably, for a primary cell (PCell, Primary cell), the subframe in the first subframe set is a downlink subframe or a special subframe indicated in SIB1 (System Information Block 1, system information block 1); and for a secondary cell (SCell, Secondary Cell), the subframe in the first subframe set is a downlink subframe or a special subframe indicated in a Radio Resource Config Common SCell IE (Radio Resource Configuration Common SCell Information element, common radio resource configuration information element of the secondary cell).

Optionally, the subframe in the first subframe set is a downlink subframe or a special subframe indicated in uplink-downlink configuration information carried by a PDCCH in a common search space, as shown in Table 1.

TABLE 1

| Uplink/downlink configuration | Downlink-to-uplink conversion point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It should be noted that, in Table 1. 'D' represents a downlink subframe, 'U' represents an uplink subframe, and 'S' represents a special subframe.

Exemplarily, if received uplink-downlink configuration information is an uplink-downlink configuration 0, downlink subframes or special subframes in the uplink-downlink configuration 0 are determined as subframes in the first subframe set, that is, the subframes in the first subframe set are subframes whose subframe numbers are 0 and 5 or subframes whose subframe numbers are 1 and 6.

It should be noted that, an extended CSS needs to be configured in the subframe in the first subframe set, that is, a first CSS needs to be configured in the subframe in the first subframe set. Meanwhile, to keep a maximum quantity of Limes of blind detection unchanged, a size of a UESS may be reduced. Therefore, to reduce a quantity of times of PDCCH search in the CSS and reduce impact on the UESS, it is unnecessary to configure the extended CSS in all downlink subframes or special subframes, that is, the base station may configure the first subframe set according to a requirement.

Specifically, after configuring the first subframe set, the base station sends first signaling to UE (User Equipment, user equipment), where the first signaling carries configuration information of the first subframe set. Preferably, the configuration information includes an allocation period M and a subframe offset $n_{OFFSET}$, where the subframe offset is a subframe offset in one allocation period. The base station determines the first subframe set according to the allocation period M and the subframe offset $n_{OFFSET}$.

The subframe in the first subframe set satisfies $(10 \times n_f + n_{sbf} - n_{OFFSET}) \bmod M = 0$. $n_f$ represents a system frame number SFN, and $n_{sbf}$ represents a subframe number.

When multiple subframe offsets are configured in the configuration information, it indicates that in one allocation period, the first subframe set includes multiple downlink subframes/special subframes.

For example, if the allocation period is 10 ms, and subframe offsets are 0 and 5, according to the formula $(10 \times n_f + n_{sbf} - n_{OFFSET}) \bmod M = 0$, it can be obtained that downlink subframes whose subframe numbers are 0 and 5 belong to the first subframe set.

Further, the first signaling is higher layer signaling or physical layer signaling. When the first signaling is physical layer signaling, the first signaling may be carried by a PDCCH/an ePDCCH, for example, the first signaling and signaling indicating an uplink-downlink subframe configuration share one PDCCH.

It should be noted that, the higher layer signaling (Higher Layer Signaling) is signaling from a higher layer and having a lower sending frequency relative to the physical layer signaling, where the higher layer signaling includes RRC (Radio Resource Control, radio resource control) signaling, MAC (Media Access Control, Media Access Control) signaling, and the like.

102: The base station configures a first CSS in a subframe in the first subframe set.

Preferably, the first CSS includes a reference CSS and a newly added CSS.

The reference CSS is a CSS defined in an existing LTE (Long Term Evolution, Long Term Evolution) system, as shown in Table 2. The reference CSS consists of the first 16 CCEs in the control area, including four candidate PDCCHs whose CCE aggregation level is 4 and two candidate PDCCHs whose CCE aggregation level is 8. The newly added CSS consists of extra N CCEs in the control area, where N is a positive integer greater than 1. The newly added CSS and the reference CSS may be continuously distributed or may be discontinuously distributed. Therefore, the first CSS consists of L CCEs in the control area, where L=16+N, and therefore L is a positive integer greater than 16.

Optionally, when CA (Carrier Aggregation, carrier aggregation) and/or CoMP (Coordinated Multiple Point, coordinated multipoint) is configured for the UE, the base station configures that the first CSS consists of L control channel elements CCEs in the control area, where L is a positive integer greater than 16, that is, the first CSS includes a reference CSS and a newly added CSS, and the newly added CSS consists of N CCEs, where N is a positive integer greater than 1. When CA and/or CoMP is not configured for the UE, the base station configures that the first CSS consists of 16 control channel elements CCEs in the control area, that is, the first CSS includes only a reference CSS, but does not include a newly added CSS.

TABLE 2

| Search space | | | Quantity of |
|---|---|---|---|
| Type | Aggregation level | Quantity of CCEs | candidate PDCCHs |
| User equipment specific search space UESS | 1 | 6 | 6 |
| | 2 | 12 | 6 |
| | 4 | 8 | 2 |
| | 8 | 16 | 2 |

TABLE 2-continued

| Type | Search space | | Quantity of candidate PDCCHs |
|---|---|---|---|
| | Aggregation level | Quantity of CCEs | |
| Common search space CSS | 4 | 16 | 4 |
| | 8 | 16 | 2 |

When the first CSS consists of L control channel elements CCEs in the control area, where L is a positive integer greater than 16, this embodiment provides three solutions to configure the first CSS.

Solution 1: The base station configures the first CSS in the subframe in the first subframe set according to a first preset rule. The first preset rule is used to indicate a size and a location of the first CSS.

It should be noted that, the size refers to a quantity of CCEs, and the location refers to a start location of the CCEs.

Preferably, the first preset rule is defined according to three methods, and correspondingly, there are three methods for configuring, by the base station, the first CSS according to the first preset rule:

Specifically, definition 1: the first preset rule is used to indicate that the first CSS includes four candidate PDCCHs whose CCE aggregation level is 4 and three candidate PDCCHs whose CCE aggregation level is 8. That is, the base station configures, according to the first preset rule, that the first CSS includes four candidate PDCCHs whose CCE aggregation level is 4 and three candidate PDCCHs whose CCE aggregation level is 8. In this way, a quantity of times of PDCCH blind detection is increased by only one. In this way, to keep the maximum quantity of times of PDCCH blind detection unchanged, the UE needs to reduce a quantity of times of PDCCH blind detection in the UESS by only one, which has relatively small impact on capacity of the UESS, as shown in Table 3.

TABLE 3

| Type | Search space | | Quantity of candidate PDCCHs |
|---|---|---|---|
| | Aggregation level | Quantity of CCEs | |
| User equipment specific search space | 1 | 5 | 5 |
| | 2 | 12 | 6 |
| | 4 | 8 | 2 |
| | 8 | 16 | 2 |
| Common search space | 4 | 16 | 4 |
| | 8 | 24 | 3 |

Definition 2: the first preset rule is used to indicate that the first CSS includes five candidate PDCCHs whose CCE aggregation level is 4 and three candidate PDCCHs whose CCE aggregation level is 8. That is, the base station configures, according to the first preset rule, that the first CSS includes five candidate PDCCHs whose CCE aggregation level is 4 and three candidate PDCCHs whose CCE aggregation level is 8. In this way, to keep the maximum quantity of times of PDCCH blind detection unchanged, the UE needs to reduce a quantity of times of PDCCH blind detection in the UESS by only two, which has slight impact on capacity of the UESS. However, as shown in Table 4, the base station may configure an aggregation level flexibly, for example, when the performance is poor, to improve the reliability, the base station may configure a PDCCH whose aggregation level is 8; and when the performance is desirable, the base station may configure a PDCCH whose aggregation level is 4, to reduce overheads and reduce a probability of a scheduling collision with a PDCCH in the UESS.

TABLE 4

| Type | Search space | | Quantity of candidate PDCCHs |
|---|---|---|---|
| | Aggregation level | Quantity of CCEs | |
| User equipment specific search space | 1 | 4 | 4 |
| | 2 | 12 | 6 |
| | 4 | 8 | 2 |
| | 8 | 16 | 2 |
| Common search space | 4 | 20 | 5 |
| | 8 | 24 | 3 |

Definition 3: the first preset rule is used to indicate that the first CSS includes six candidate PDCCHs whose CCE aggregation level is 4 and three candidate PDCCHs whose CCE aggregation level is 8. That is, the base station configures, according to the first preset rule, that the first CSS includes six candidate PDCCHs whose CCE aggregation level is 4 and three candidate PDCCHs whose CCE aggregation level is 8. In this way, to keep the maximum quantity of times of PDCCH blind detection unchanged, a quantity of times of PDCCH blind detection in the UESS needs to be reduced by three, as shown in Table 5.

TABLE 5

| Type | Search space | | Quantity of candidate PDCCHs |
|---|---|---|---|
| | Aggregation level | Quantity of CCEs | |
| User equipment specific search space | 1 | 4 | 4 |
| | 2 | 10 | 5 |
| | 4 | 8 | 2 |
| | 8 | 16 | 2 |
| Common search space | 4 | 24 | 6 |
| | 8 | 24 | 3 |

Solution 2: The base station configures the first CSS in the subframe in the first subframe set according to a second preset rule. The second preset rule is used to indicate a size and a location of the newly added CSS.

It should be noted that, the size refers to a quantity of CCEs, and the location refers to a start location of the CCEs.

Specifically, the configuring, by the base station, the first CSS in the subframe in the first subframe set according to a second preset rule includes two steps:

The base station configures that the reference CSS consists of the first 16 CCEs in the control area, including four candidate PDCCHs whose CCE aggregation level is 4 and two candidate PDCCHs whose CCE aggregation level is 8.

The base station configures the newly added CSS according to the second preset rule. Similar to the first preset rule, the second preset rule is defined according to three methods, and correspondingly, there are three methods for configuring, by the base station, the newly added CSS according to the second preset rule:

Definition 1: the second preset rule is used to indicate that the newly added CSS includes one candidate PDCCH whose CCE aggregation level is 8. That is, the base station configures, according to the second preset rule, that the newly added CSS includes one candidate PDCCH whose CCE aggregation level is 8. In this way, a quantity of times of PDCCH blind detection is increased by only one. In this way, to keep the maximum quantity of times of PDCCH blind detection unchanged, the UE needs to reduce a quantity of times of PDCCH blind detection in the UESS by only one, which has relatively small impact on capacity of the UESS.

Definition 2: the second preset rule is used to indicate that the newly added CSS includes one candidate PDCCH whose CCE aggregation level is 4 and one candidate PDCCH whose CCE aggregation level is 8. That is, the base station configures, according to the second preset rule, that the newly added CSS includes one candidate PDCCH whose CCE aggregation level is 4 and one candidate PDCCH whose CCE aggregation level is 8. In this way, to keep the maximum quantity of times of PDCCH blind detection unchanged, the UE needs to reduce a quantity of times of PDCCH blind detection in the UESS by only two, which has slight impact on capacity of the UESS. However, the base station may configure an aggregation level flexibly, for example, when the performance is poor, to improve the reliability, the base station may configure a PDCCH whose aggregation level is 8; and when the performance is desirable, the base station may configure a PDCCH whose aggregation level is 4, to reduce overheads and reduce a probability of a scheduling collision with a PDCCH in the UESS.

Definition 3: the second preset rule is used to indicate that the newly added CSS includes two candidate PDCCHs whose CCE aggregation level is 4 and one candidate PDCCH whose CCE aggregation level is 8. That is, the base station configures, according to the second preset rule, that the newly added CSS includes two candidate PDCCHs whose CCE aggregation level is 4 and one candidate PDCCH whose CCE aggregation level is 8. In this way, to keep the maximum quantity of times of PDCCH blind detection unchanged, a quantity of times of PDCCH blind detection in the UESS needs to be reduced by three.

Solution 3: The base station may configure the first CSS in the subframe in the first subframe set according to a requirement, and send second signaling to the UE after configuring the first CSS. The second signaling is used to indicate a size of the first CSS and/or a location of the first CSS. Alternatively, the base station may configure a newly added CSS according to a requirement, and send third signaling to the UE after configuring the newly added CSS. The third signaling is used to indicate a size of the newly added CSS and/or a location of the newly added CSS.

Further, the second/third signaling is higher layer signaling or physical layer signaling. When the second/third signaling is physical layer signaling, the second/third signaling may be carried by a PDCCH/an ePDCCH, for example, the second/third signaling and signaling indicating an uplink-downlink subframe configuration share one PDCCH/ePDCCH.

Optionally, N methods for configuring the first/newly added CSS (for example, the N methods for configuring the first/newly added CSS include the three configurations shown in definitions 1, 2, and 3 in solutions 1 and 2) may be defined in a standard in advance, and the base station may determine, according to a requirement, which one of the N methods for configuring the first/newly added CSS is used; then the base station sends the second/third signaling to the UE, to indicate which one of the N configurations is used. In this case, the second/third signaling is used to indicate which one of the N methods for configuring the first/newly added CSS that are defined in advance in the standard is used by the base station. Solution 3 is more flexible, and the base station may adaptively adjust the size and location of the first CSS according to a current channel quality condition and cell load condition.

103: The base station determines a PDCCH for carrying uplink-downlink configuration information, where the PDCCH is a PDCCH in the first CSS.

Preferably, that the base station determines a PDCCH for carrying uplink-downlink configuration information specifically includes:

The base station determines whether the reference CSS includes an idle PDCCH. If there are multiple types of DCI (Downlink Control Information, downlink control information) needing to be carried in the reference CSS currently, due to a limited size of the reference CSS, there may be no idle PDCCH (where an idle PDCCH is a PDCCH that does not carry DCI).

If the base station determines that the reference CSS includes an idle PDCCH, the base station determines that the PDCCH for carrying the uplink-downlink configuration information is the idle PDCCH. If the base station determines that the reference CSS does not include an idle PDCCH, the base station determines that the PDCCH for carrying the uplink-downlink configuration information is a PDCCH in the newly added CSS.

Exemplarily, when the base station needs to send X (where X is a positive integer greater than 1) groups of uplink-downlink configuration information, X PDCCHs may be needed to carry the X groups of uplink-downlink configuration information, and in this case, a quantity of idle PDCCHs needed is also X. That is, the base station determines whether the reference CSS includes idle PDCCHs.

Specifically, the base station determines whether the reference CSS includes X idle PDCCHs. If the base station determines that the reference CSS includes X idle PDCCHs, the base station determines that the X PDCCHs for carrying the uplink-downlink configuration information are the X idle PDCCHs. If the base station determines that the reference CSS does not include X idle PDCCHs, the base station determines that the X PDCCHs for carrying the uplink-downlink configuration information include PDCCHs in the newly added CSS.

It should be noted that, when this method is used, PDCCHs in the reference CSS are used first, and in this way, when the newly added CSS is not used, the size of the UESS may not be reduced.

104: The base station configures the first UESS in the subframe in the first subframe set.

The first UESS may be a set consisting of candidate PDCCHs that need to be monitored by the UE, or may be a set consisting of candidate ePDCCHs that need to be monitored by the UE.

In this embodiment of the present invention, three methods are provided to configure the first UESS.

Method 1: The base station configures the first UESS according to a maximum quantity of times of PDCCH blind detection of the UE, where the maximum quantity of times of PDCCH blind detection of the UE is a total quantity of times of PDCCH blind detection performed by the UE in the first CSS and the first UESS.

Specifically, the base station configures the first UESS, and ensures that the maximum quantity of times of PDCCH blind detection performed by the UE in the first UESS and the first CSS is a fixed value (for example, 44 or 60). When the base station configures the first CSS, a quantity of PDCCHs in the first CSS is greater than a quantity of PDCCHs in the reference CSS, and in this case, a quantity of times of PDCCH blind detection performed by the UE increases. To ensure that the maximum quantity of times of PDCCH blind detection of the UE does not change, when configuring the first UESS, the base station may reduce a quantity of PDCCHs in the first UESS.

Method 2: The base station configures the first UESS according to a third preset rule, so that a decrease in a quantity of candidate PDCCHs or candidate ePDCCHs in the first UESS is equal to a quantity of candidate PDCCHs in the newly added CSS, to ensure that the maximum quantity of times of PDCCH blind detection of the UE does not change.

The third preset rule is used to indicate a size and a location of the first UESS. The third preset rule corresponds to the first/second preset rule, and the third preset rule is defined according to four methods; correspondingly, there are four methods for configuring, by the base station, the first UESS according to the third preset rule:

Specifically, definition 1: the third preset rule is used to indicate that the first CSS includes four candidate PDCCHs whose CCE aggregation level is 4 and three candidate PDCCHs whose CCE aggregation level is 8 (or the newly added CSS includes one candidate PDCCH whose CCE aggregation level is 8), and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8. That is, the base station configures, according to the third preset rule, that the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8.

Definition 2: the third preset rule is used to indicate that the first CSS includes five candidate PDCCHs whose CCE aggregation level is 4 and three candidate PDCCHs whose CCE aggregation level is 8 (or the newly added CSS includes one candidate PDCCH whose CCE aggregation level is 4 and one candidate PDCCH whose CCE aggregation level is 8), and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8. That is, the base station configures, according to the third preset rule, that the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8.

It should be noted that, considering that for one same candidate PDCCH in the first UESS, PDCCH blind detection is performed according to at least two DCI bit values, for one same candidate PDCCH, at least two times of PDCCH blind detection is generated. For the newly added CSS, preferably, PDCCH blind detection may be performed according to one DCI bit value, and therefore, for one same candidate PDCCH, only one Lime of PDCCH blind detection is generated. Therefore, the quantity of candidate PDCCHs in the first UESS may be decreased by only one compared with an existing UESS, that is, the first UESS may include five candidate PDCCHs whose CCE aggregation level is 1. Certainly, in the newly added CSS, PDCCH blind detection may also be performed according to two DCI bit values, and in this case, for one same candidate PDCCH, only two times of PDCCH blind detection is generated. Therefore, the quantity of candidate PDCCHs in the first UESS needs to be decreased by two compared with the existing UESS, that is, the first UESS may include four candidate PDCCHs whose CCE aggregation level is 1. This is also applicable to definition 3 and definition 4, and details are not described herein again.

Definition 3: the third preset rule is used to indicate that the first CSS includes six candidate PDCCHs whose CCE aggregation level is 4 and three candidate PDCCHs whose CCE aggregation level is 8 (or the newly added CSS includes two candidate PDCCHs whose CCE aggregation level is 4 and one candidate PDCCH whose CCE aggregation level is 8), and the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8. That is, the base station configures, according to the third preset rule, that the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8.

Definition 4: the third preset rule is used to indicate that when the first CSS includes six candidate PDCCHs whose CCE aggregation level is 4 and three candidate PDCCHs whose CCE aggregation level is 8 (or the newly added CSS includes two candidate PDCCHs whose CCE aggregation level is 4 and one candidate PDCCH whose CCE aggregation level is 8), the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8. That is, the base station configures, according to the third preset rule, that the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

Further, the base station configures the first UESS according to whether the PDCCH carrying the uplink-downlink configuration information belongs to the reference CSS, which specifically includes:

when the PDCCH carrying the uplink-downlink configuration information is the idle PDCCH in the reference CSS, configuring, by the base station, that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or when the PDCCH carrying the uplink-downlink configuration information is the PDCCH in the newly added CSS, configuring, by the base station, the first UESS according to the third preset rule, where a specific method is described in solution 1, and details are not described herein again; or configuring, by the base station, the first UESS according to the maximum quantity of times of PDCCH blind detection of the UE, where specifically, when the PDCCH carrying the uplink-downlink configuration information is the PDCCH in the newly added CSS, the base station configures the first UESS, and ensures that the maximum quantity of times of PDCCH blind detection performed by the UE in the first UESS and the first CSS is a fixed value (for example, 44 or 60), that is, ensures that the maximum quantity of times of PDCCH blind detection performed by the UE in the first UESS and the first CSS does not change and is the same as a maximum quantity of times of PDCCH blind detection of the UE in the prior art.

Exemplarily, when the base station needs to send X (where X is a positive integer greater than 1) groups of uplink-downlink configuration information, X PDCCHs may be needed to carry the X groups of uplink-downlink configuration information, and in this case, a quantity of idle PDCCHs needed is also X.

Specifically, when the X PDCCHs carrying the uplink-downlink configuration information are X idle PDCCHs in the reference CSS, the base station configures that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; when the X PDCCHs carrying the uplink-downlink configuration information include PDCCHs in the newly added CSS, the base station configures the first UESS according to the third preset rule, or the base station configures the first UESS according to the maximum quantity of times of PDCCH blind detection of the UE.

When this method is used, the size of the first UESS can be changed adaptively, and when the newly added CSS is not used, the size of the UESS does not change, so that impact on the UESS is reduced.

Method 3: The base station may configure the first UESS in the subframe in the first subframe set according to a requirement, and send fourth signaling to the UE after configuring the first UESS.

The fourth signaling is used to indicate a size of the first UESS and/or a location of the first UESS.

Further, the fourth signaling is higher layer signaling or physical layer signaling. When the fourth signaling is physical layer signaling, the fourth signaling may be carried by a PDCCH/an ePDCCH, for example, the fourth signaling and signaling indicating an uplink-downlink subframe configuration share one PDCCH/ePDCCH.

Optionally, N configurations of the first UESS (for example, the N configurations of the first UESS include the four configurations shown in definitions 1, 2, 3, and 4 in method 2) are defined in advance in the standard, and the base station may determine, according to a requirement, which one of the N methods for configuring the first UESS is used; then, the base station sends the fourth signaling to the UE, to indicate which one of the N configurations is used. In this case, the fourth signaling is used to indicate which one of the N methods for configuring the first UESS that are defined in advance in the standard is used by the base station. Solution 3 is more flexible, and the base station may adaptively adjust the size and location of the first UESS according to a current channel quality condition and cell load condition.

105: The base station sends the PDCCH carrying the uplink-downlink configuration information to UE, where the PDCCH is the PDCCH in the first CSS.

Specifically, after determining the PDCCH for carrying the uplink-downlink configuration information, the base station adds the uplink-downlink configuration information to the PDCCH, and sends the PDCCH to the UE.

It should be noted that, in this embodiment, step 101 is performed first, then step 102, step 103, and step 104 are performed, and finally step 105 is performed. There are two time sequences for step 102, step 103, and step 104: First, when a configuration of the first UESS does not rely on a location, in the CSS, of the PDCCH carrying the uplink-downlink configuration information, there may be no definite time sequence relationship between step 102 and step 104, where step 102 and step 104 may be performed simultaneously or performed one after another, and step 103 is performed after step 102 and step 104; second, when a configuration of the first UESS relies on a location, in the CSS, of the PDCCH carrying the uplink-downlink configuration information, an execution sequence is step 102, step 103, and step 104 successively.

This embodiment of the present invention provides a method for configuring a search space, where a base station configures a first CSS in a subframe in a first subframe set, determines, in the first CSS, a PDCCH for carrying uplink-downlink configuration information, and sends the PDCCH carrying the uplink-downlink configuration information. Because the first CSS is larger than a CSS specified in the prior art, a PDCCH for carrying uplink-downlink configuration information can surely be found, which ensures sending of the uplink-downlink configuration information, so that UE can acquire, in time, the uplink-downlink configuration information configured by the base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

Figure 2:
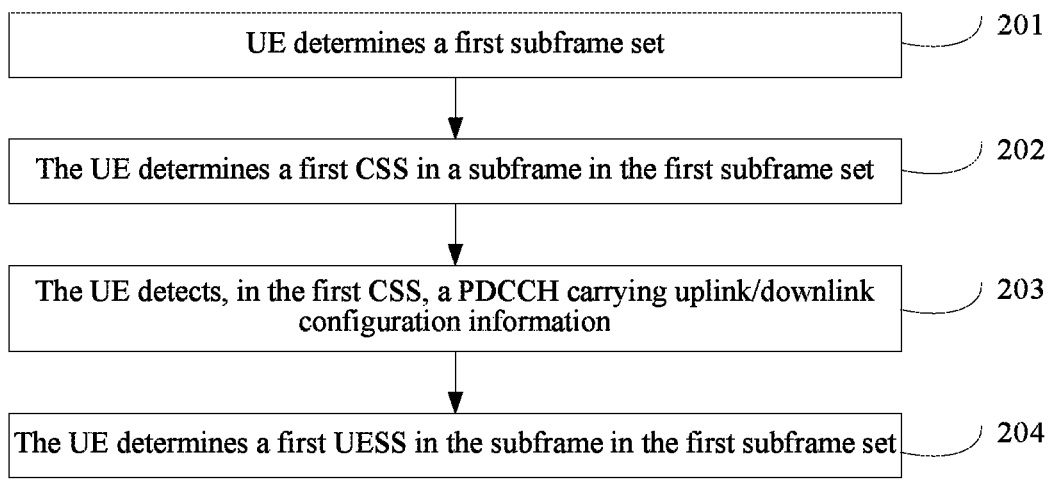
FIG. 2 is a schematic flowchart of another method for configuring a search space according to an embodiment of the present invention.

An embodiment of the present invention provides a method for configuring a search space. As shown in FIG. 2, the method includes:

201: UE determines a first subframe set.

A subframe in the first subframe set is a downlink subframe or a special subframe.

Preferably, for a primary cell, the subframe in the first subframe set is a downlink subframe or a special subframe indicated in SIB1. For a secondary cell, the subframe in the first subframe set is a downlink subframe or a special subframe indicated in a Radio Resource Config Common SCell IE.

Optionally, the subframe in the first subframe set is a downlink subframe or a special subframe indicated in uplink-downlink configuration information carried by a PDCCH in a common search space.

It should be noted that, an extended CSS needs to be configured in the subframe in the first subframe set, that is, a first CSS needs to be configured in the subframe in the first subframe set. Meanwhile, to keep a maximum quantity of times of blind detection unchanged, a size of a UESS may be reduced. Therefore, to reduce a quantity of times of PDCCH search in the CSS and reduce impact on the UESS, it is unnecessary to configure the extended CSS in all downlink subframes or special subframes, that is, a base station may configure the first subframe set according to a requirement.

Specifically, the UE receives first signaling sent by the base station, where the first signaling carries configuration information of the first subframe set; and the UE determines the first subframe set according to the first signaling. Preferably, the configuration information includes an allocation period M and a subframe offset $n_{OFFSET}$, where the subframe offset is a subframe offset in one allocation period. The UE determines the first subframe set according to the allocation period M and the subframe offset $n_{OFFSET}$.

The subframe in the first subframe set satisfies $(10 \times n_f + n_{sbf} - n_{OFFSET}) \mod M = 0$. $n_f$ represents a system frame number SFN, and $n_{sbf}$ represents a subframe number.

Further, the first signaling is higher layer signaling or physical layer signaling. When the first signaling is physical layer signaling, the first signaling may be carried by a PDCCH/an ePDCCH, for example, the first signaling and signaling indicating an uplink-downlink subframe configuration share one PDCCH/ePDCCH.

It should be noted that, the higher layer signaling is signaling from a higher layer and having a lower sending frequency relative to the physical layer signaling, where the higher layer signaling includes RRC signaling, MAC signaling, and the like.

202: The UE determines a first CSS in a subframe in the first subframe set.

Preferably, the first CSS includes a reference CSS and a newly added CSS.

The reference CSS is a CSS defined in an existing LTE system. The reference CSS consists of the first 16 CCEs in a control area, including four candidate PDCCHs whose CCE aggregation level is 4 and two candidate PDCCHs whose CCE aggregation level is 8. The newly added CSS consists of extra N CCEs in the control area, where N is a positive integer greater than 1. The newly added CSS and the reference CSS may be continuously distributed or may be discontinuously distributed. Therefore, the first CSS consists of L CCEs in the control area, where L is a positive integer greater than 16.

Optionally, when CA and/or CoMP is configured for the UE, the UE determines that the first CSS consists of L control channel elements CCEs in the control area, where L is a positive integer greater than 16, that is, the first CSS includes a reference CSS and a newly added CSS, and the newly added CSS consists of N CCEs, where N is a positive integer greater than 1; when CA and/or CoMP is not configured for the UE, the UE determines that the first CSS consists of 16 control channel elements CCEs in the control area, that is, the first CSS includes only a reference CSS, but does not include a newly added CSS.

When the first CSS consists of L control channel elements CCEs in the control area, where L is a positive integer greater than 16, this embodiment provides three solutions to configure the first CSS:

Solution 1: The UE determines the first CSS in the subframe in the first subframe set according to a first preset rule. The first preset rule is used to indicate a size and a location of the first CSS.

It should be noted that, the size refers to a quantity of CCEs, and the location refers to a start location of the CCEs.

Preferably, the first preset rule is defined according to three methods, and correspondingly, there are three methods for determining, by the UE, the first CSS according to the first preset rule:

Specifically, definition 1: the first preset rule is used to indicate that the first CSS includes four candidate PDCCHs whose CCE aggregation level is 4 and three candidate PDCCHs whose CCE aggregation level is 8. That is, the UE determines, according to the first preset rule, that the first CSS includes four candidate PDCCHs whose CCE aggregation level is 4 and three candidate PDCCHs whose CCE aggregation level is 8. In this way, a quantity of times of PDCCH blind detection is increased by only one. In this way, to keep the maximum quantity of times of PDCCH blind detection unchanged, the UE needs to reduce a quantity of times of PDCCH blind detection in the UESS by only one, which has relatively small impact on capacity of the UESS.

Definition 2: the first preset rule is used to indicate that the first CSS includes five candidate PDCCHs whose CCE aggregation level is 4 and three candidate PDCCHs whose CCE aggregation level is 8. That is, the UE determines, according to the first preset rule, that the first CSS includes five candidate PDCCHs whose CCE aggregation level is 4 and three candidate PDCCHs whose CCE aggregation level is 8. In this way, to keep the maximum quantity of times of PDCCH blind detection unchanged, the UE needs to reduce a quantity of times of PDCCH blind detection in the UESS by only two, which has slight impact on capacity of the UESS.

Definition 3: the first preset rule is used to indicate that the first CSS includes six candidate PDCCHs whose CCE aggregation level is 4 and three candidate PDCCHs whose CCE aggregation level is 8. That is, the UE determines, according to the first preset rule, that the first CSS includes six candidate PDCCHs whose CCE aggregation level is 4 and three candidate PDCCHs whose CCE aggregation level is 8. In this way, to keep the maximum quantity of times of PDCCH blind detection unchanged, a quantity of times of PDCCH blind detection in the UESS needs to be reduced by three.

Solution 2: The UE determines the first CSS in the subframe in the first subframe set according to a second preset rule. The second preset rule is used to indicate a size and a location of the newly added CSS.

It should be noted that, the size refers to a quantity of CCEs, and the location refers to a start location of the CCEs. Specifically, the determining, by the UE, the first CSS in the subframe in the first subframe set according to a second preset rule includes two steps:

The UE determines that the reference CSS consists of the first 16 CCEs in the control area, including four candidate PDCCHs whose CCE aggregation level is 4 and two candidate PDCCHs whose CCE aggregation level is 8.

The UE determines the newly added CSS according to the second preset rule. Similar to the first preset rule, the second preset rule is defined according to three methods, and correspondingly, there are three methods for determining, by the UE, the newly added CSS according to the second preset rule:

Definition 1: the second preset rule is used to indicate that the newly added CSS includes one candidate PDCCH whose CCE aggregation level is 8. That is, the UE determines, according to the second preset rule, that the newly added CSS includes one candidate PDCCH whose CCE aggregation level is 8. In this way, a quantity of times of PDCCH blind detection is increased by only one. In this way, to keep the maximum quantity of times of PDCCH blind detection unchanged, the UE needs to reduce a quantity of times of PDCCH blind detection in the UESS by only one, which has relatively small impact on capacity of the UESS.

Definition 2: the second preset rule is used to indicate that the newly added CSS includes one candidate PDCCH whose CCE aggregation level is 4 and one candidate PDCCH whose CCE aggregation level is 8. That is, the UE determines, according to the second preset rule, that the newly added CSS includes one candidate PDCCHs whose CCE aggregation level is 4 and one candidate PDCCH whose CCE aggregation level is 8. In this way, to keep the maximum quantity of times of PDCCH blind detection unchanged, the UE needs to reduce a quantity of times of PDCCH blind detection in the UESS by only two, which has slight impact on capacity of the UESS.

Definition 3: the second preset rule is used to indicate that the newly added CSS includes two candidate PDCCHs whose CCE aggregation level is 4 and one candidate PDCCH whose CCE aggregation level is 8. That is, the UE determines, according to the second preset rule, that the newly added CSS includes two candidate PDCCHs whose CCE aggregation level is 4 and one candidate PDCCH whose CCE aggregation level is 8. In this way, to keep the maximum quantity of times of PDCCH blind detection unchanged, a quantity of times of PDCCH blind detection in the UESS needs to be reduced by three.

Solution 3: The UE receives second signaling sent by the base station, where the second signaling is used to indicate a size of the first CSS and/or a location of the first CSS; and the UE determines the first CSS according to the second signaling. Alternatively, the UE receives third signaling sent by the base station. The third signaling is used to indicate a size of the newly added CSS and/or a location of the newly added CSS. The UE determines the newly added CSS according to the third signaling.

Further, the second/third signaling is higher layer signaling or physical layer signaling. When the second/third signaling is physical layer signaling, the second/third signaling may be carried by a PDCCH/an ePDCCH, for example, the second/third signaling and signaling indicating an uplink-downlink subframe configuration share one PDCCH/ePDCCH.

Optionally N methods for configuring the first/newly added CSS (for example, the N methods for configuring the first/newly added CSS include the three configurations shown in definitions 1, 2, and 3 in solutions 1 and 2) may be defined in a standard in advance, and the base station may determine, according to a requirement, which one of the N methods for configuring the first/newly added CSS is used, and send the second/third signaling to the UE, to indicate which one of the N configurations is used. In this case, the UE receives the second/third instruction, and may determine, according to the second/third instruction, which one of the methods for configuring the first/newly added CSS is used.

203: The UE detects, in the first CSS, a PDCCH carrying uplink-downlink configuration information.

Preferably, the detecting, by the UE in the first CSS, a physical downlink control channel PDCCH carrying uplink-downlink configuration information specifically includes:

first detecting, by the UE in the reference CSS, the PDCCH carrying the uplink-downlink configuration information, and determining whether the reference CSS includes the PDCCH carrying the uplink-downlink configuration information; and if the UE determines that the reference CSS includes the PDCCH carrying the uplink-downlink configuration information, skipping detecting, in the newly added CSS, the PDCCH carrying the uplink-downlink configuration information; or if the UE determines that the reference CSS does not include the PDCCH carrying the uplink-downlink configuration information, detecting, by the UE in the newly added CSS, the PDCCH carrying the uplink-downlink configuration information.

Exemplarily, when the UE needs to receive X (where X is a positive integer greater than 1) groups of uplink-downlink configuration information, X PDCCHs may be needed to carry the X groups of uplink-downlink configuration information, and in this case, a quantity of idle PDCCHs needed is also X. That is, the UE determines whether the reference CSS includes idle PDCCHs.

Specifically, the UE determines whether the reference CSS includes X idle PDCCHs. If the UE determines that the reference CSS includes X idle PDCCHs, the UE determines that the X PDCCHs carrying the uplink-downlink configuration information are the X idle PDCCHs. If the UE determines that the reference CSS does not include X idle PDCCHs, the UE determines that the X PDCCHs carrying the uplink-downlink configuration information include PDCCHs in the newly added CSS.

It should be noted that, when this method is used, PDCCHs in the reference CSS are used first, and in this way, when the newly added CSS is not used, the size of the UESS may not be reduced.

204: The UE determines a first UESS in the subframe in the first subframe set.

The first UESS may be a set consisting of candidate PDCCHs that need to be monitored by the UE, or may be a set consisting of candidate ePDCCHs that need to be monitored by the UE.

In this embodiment of the present invention, three methods are provided to determine the first UESS.

Method 1: The UE determines the first UESS according to a maximum quantity of times of PDCCH blind detection of the UE, where the maximum quantity of times of PDCCH blind detection of the UE is a total quantity of times of PDCCH blind detection performed by the UE in the first CSS and the first UESS.

Specifically, the UE determines the first UESS, and it is ensured that the maximum quantity of times of PDCCH blind detection performed by the UE in the first UESS and the first CSS is a fixed value (for example, 44 or 60). A quantity of PDCCHs in the first CSS is greater than a quantity of PDCCHs in the reference CSS, and in this case, the quantity of times of PDCCH blind detection performed by the UE increases. To ensure that the maximum quantity of times of PDCCH blind detection of the UE does not change, a quantity of PDCCHs in the first UESS is reduced.

Method 2: The UE determines the first UESS according to a third preset rule, so that a decrease in a quantity of candidate PDCCHs in the first UESS is equal to a quantity of candidate PDCCHs in the newly added CSS, to ensure that the maximum quantity of times of PDCCH blind detection of the UE does not change.

The third preset rule is used to indicate a size and a location of the first UESS. The third preset rule corresponds to the first/second preset rule, and the third preset rule is defined according to four methods; correspondingly, there are four methods for configuring, by the base station, the first UESS according to the third preset rule:

Specifically, definition 1: the third preset rule is used to indicate that the first CSS includes four candidate PDCCHs whose CCE aggregation level is 4 and three candidate PDCCHs whose CCE aggregation level is 8 (or the newly added CSS includes one candidate PDCCH whose CCE aggregation level is 8), and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8. That is, the UE determines, according to the third preset rule, that the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8.

Definition 2: the third preset rule is used to indicate that the first CSS includes five candidate PDCCHs whose CCE aggregation level is 4 and three candidate PDCCHs whose CCE aggregation level is 8 (or the newly added CSS includes one candidate PDCCH whose CCE aggregation level is 4 and one candidate PDCCH whose CCE aggregation level is 8), and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8. That is, the UE determines, according to the third preset rule, that the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8.

It should be noted that, considering that for one same candidate PDCCH in the first UESS, PDCCH blind detection is performed according to at least two DCI bit values, for one same candidate PDCCH, at least two times of PDCCH blind detection is generated. For the newly added CSS, preferably, PDCCH blind detection may be performed according to one DCI bit value, and therefore, for one same candidate PDCCH, only one time of PDCCH blind detection is generated. Therefore, the quantity of candidate PDCCHs in the first UESS may decreased by only one compared with an existing UESS, that is, the first UESS may include five candidate PDCCHs whose CCE aggregation level is 1. Certainly, in the newly added CSS, PDCCH blind detection may also be performed according to two DCI bit values, and in this case, for one same candidate PDCCH, only two times of PDCCH blind detection is generated. Therefore, the quantity of candidate PDCCHs in the first UESS needs to be decreased by two compared with the existing UESS, that is, the first UESS may include four candidate PDCCHs whose CCE aggregation level is 1. This is also applicable to definition 3 and definition 4, and details are not described herein again.

Definition 3: the third preset rule is used to indicate that the first CSS includes six candidate PDCCHs whose CCE aggregation level is 4 and three candidate PDCCHs whose CCE aggregation level is 8 (or the newly added CSS includes two candidate PDCCHs whose CCE aggregation level is 4 and one candidate PDCCH whose CCE aggregation level is 8), and the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8. That is, the UE determines, according to the third preset rule, that the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8.

Definition 4: the third preset rule is used to indicate that when the first CSS includes six candidate PDCCHs whose CCE aggregation level is 4 and three candidate PDCCHs whose CCE aggregation level is 8 (or the newly added CSS includes two candidate PDCCHs whose CCE aggregation level is 4 and one candidate PDCCH whose CCE aggregation level is 8), the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8. That is, the UE determines, according to the third preset rule, that the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

Further, the UE determines the first UESS according to whether the PDCCH carrying the uplink-downlink configuration information belongs to the reference CSS, which specifically includes:

if the UE determines that the reference CSS includes the PDCCH carrying the uplink-downlink configuration information, determining that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or if the UE determines that the reference CSS does not include the PDCCH carrying the uplink-downlink configuration information, determining the first UESS according to the third preset rule, where a specific method is described in solution 1, and details are not described herein again; or determining, by the UE, the first UESS according to the maximum quantity of times of PDCCH blind detection of the UE, where specifically, when the PDCCH carrying the uplink-downlink configuration information is the PDCCH in the newly added CSS, the UE determines the first UESS, and it is ensured that the maximum quantity of times of PDCCH blind detection performed by the UE in the first UESS and the first CSS is a fixed value (for example, 44 or 60), that is, it is ensured that the maximum quantity of times of PDCCH blind detection performed by the UE in the first UESS and the first CSS does not change and is the same as a maximum quantity of times of PDCCH blind detection of the UE in the prior art.

Exemplarily, when the UE needs to send X (where X is a positive integer greater than 1) groups of uplink-downlink configuration information, X PDCCHs may be needed to carry the X groups of uplink-downlink configuration information, and in this case, a quantity of idle PDCCHs needed is also X.

Specifically, if the UE determines that the reference CSS includes the X PDCCHs carrying the uplink-downlink configuration information, the base station configures that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; if the UE determines that the reference CSS does not include the X PDCCHs carrying the uplink-downlink configuration information, the base station configures the first UESS according to the third preset rule, or the UE determines the first UESS according to the maximum quantity of times of PDCCH blind detection of the UE.

When this method is used, the size of the first UESS can be changed adaptively, and when the newly added CSS is not used, the size of the UESS does not change, so that impact on the UESS is reduced.

Method 3: The UE receives fourth signaling sent by the base station. The UE determines the first UESS according to the fourth signaling.

The fourth signaling is used to indicate a size of the first UESS and/or a location of the first UESS. The UE determines the first UESS according to the fourth signaling.

Further, the fourth signaling is higher layer signaling or physical layer signaling. When the fourth signaling is physical layer signaling, the fourth signaling may be carried by a PDCCH/an ePDCCH, for example, the fourth signaling and signaling indicating an uplink-downlink subframe configuration share one PDCCH.

Optionally, N configurations of the first UESS (for example, the N configurations of the first UESS include the four configurations shown in definitions 1, 2, 3, and 4 in method 2) are defined in advance in the standard, and the base station may determine, according to a requirement, which one of the N methods for configuring the first UESS is used, and send the fourth signaling to the UE, to indicate which one of the N configurations is used. In this case, the UE receives the fourth signaling, and may determine, according to the fourth signaling, which one of the N configurations is used.

It should be noted that, in this embodiment, step 201 is performed first, then step 202, step 203, and step 204 are performed. There are two time sequences for step 202, step 203, and step 204: First, when a configuration of the first UESS does not rely on a location, in the CSS, of the PDCCH carrying the uplink-downlink configuration information, there may be no definite Lime sequence relationship between step 202 and step 204, where step 202 and step 204 may be performed simultaneously or performed one after another, and step 203 is performed after step 202 and step 204; second, when a configuration of the first UESS relies on a location, in the CSS, of the PDCCH carrying the uplink-downlink configuration information, an execution sequence is step 202, step 203, and step 204 successively.

This embodiment of the present invention provides a method for configuring a search space, where UE determines a first CSS in a subframe in a first subframe set, and receives, in the first CSS, a PDCCH carrying uplink-downlink configuration information. Because the first CSS is larger than a CSS specified in the prior art, a PDCCH for carrying uplink-downlink configuration information can surely be found, so that the UE can acquire, in time, the uplink-downlink configuration information configured by a base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

Figure 3:
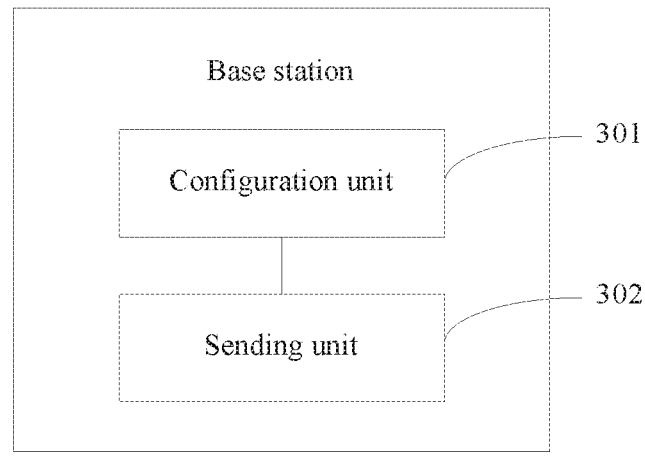
FIG. 3 is a schematic diagram of functions of a base station according to an embodiment of the present invention.

As shown in FIG. 3, FIG. 3 is a schematic diagram of functions of a base station according to an embodiment of the present invention. Referring to FIG. 3, the base station includes:

a configuration unit 301, configured to configure a first subframe set.

A subframe in the first subframe set is a downlink subframe or a special subframe. Because a special subframe includes a DwPTS that can be used for downlink data transmission, and a control area exists in the DwPTS, the subframe in the first subframe set may be a special subframe.

It should be noted that, the control area consists of a sequence of CCEs, and both a CSS and a UESS belong to the control area.

Preferably, for a primary cell, the subframe in the first subframe set is a downlink subframe or a special subframe indicated in system information block 1 SIB1; and for a secondary cell, the subframe in the first subframe set is a downlink subframe or a special subframe indicated in a common radio resource configuration information element of the secondary cell Radio Resource Config Common SCell IE.

Optionally the subframe in the first subframe set is a downlink subframe or a special subframe indicated in uplink-downlink configuration information carried by a PDCCH in a common search space.

The configuration unit 301 is further configured to configure a first CSS in the subframe in the first subframe set.

Preferably, the first CSS consists of L CCEs in the control area, where L is a positive integer greater than 16. The first CSS includes a reference CSS and a newly added CSS.

It should be noted that, the reference CSS is a CSS defined in an existing LTE system. The reference CSS consists of the first 16 CCEs in the control area, including four candidate PDCCHs whose CCE aggregation level is 4 and two candidate PDCCHs whose CCE aggregation level is 8. The newly added CSS consists of extra N CCEs in the control area, where N is a positive integer greater than 1. The newly added CSS and the reference CSS may be continuously distributed or may be discontinuously distributed. Therefore, the first CSS consists of L CCEs in the control area, where L is a positive integer greater than 16.

The configuration unit 301 is specifically configured to configure the reference CSS, where the reference CSS consists of the first 16 CCEs in the control area; and configure the newly added CSS, where the newly added CSS consists of N CCEs in the control area.

N is equal to L−16, and the N CCEs do not include the first 16 CCEs in the control area.

Optionally, when CA and/or CoMP is configured for UE, the configuration unit 301 is specifically configured to configure that the first CSS consists of L control channel elements CCEs in the control area.

L is a positive integer greater than 16, that is, the first CSS includes a reference CSS and a newly added CSS, and the newly added CSS consists of N CCEs, where N is a positive integer greater than 1.

When CA and/or CoMP is not configured for the UE, the configuration unit 301 is specifically configured to configure that the first CSS consists of 16 control channel elements CCEs in the control area, that is, the first CSS includes only a reference CSS, but does not include a newly added CSS.

Further, when the first CSS consists of L control channel elements CCEs in the control area, where L is a positive integer greater than 16, there are three methods for configuring, by the configuration unit 301, the first CSS, which are specifically as follows:

The configuration unit 301 is specifically configured to configure the first CSS according to a first preset rule.

The first preset rule is used to indicate a size and a location of the first CSS.

Specifically, the first preset rule is used to indicate that the first CSS includes four candidate PDCCHs whose CCE aggregation level is 4 and three candidate PDCCHs whose CCE aggregation level is 8; the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

Alternatively, the configuration unit 301 is specifically configured to configure the newly added CSS according to a second preset rule.

The second preset rule is used to indicate a size and a location of the newly added CSS.

It should be noted that, the size refers to a quantity of CCEs, and the location refers to a start location of the CCEs.

Specifically, the second preset rule is used to indicate that the newly added CSS includes one candidate PDCCH whose CCE aggregation level is 8; the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

It should be noted that, the configuration unit 301 may configure the reference CSS according to a reference CSS configuration method in the prior art, and after finishing configuring the reference CSS, the configuration unit 301 may configure the newly added CSS according to the second preset rule.

Alternatively, the configuration unit 301 is specifically configured to configure the first CSS according to a requirement, and after configuring the first CSS, trigger a sending unit 302 to send second signaling to the UE. Alternatively, the configuration unit 301 is specifically configured to configure the newly added CSS according to a requirement, and after configuring the newly added CSS, trigger a sending unit 302 to send third signaling to the UE.

The second signaling is used to indicate a size of the first CSS and/or a location of the first CSS. The third signaling is used to indicate a size of the newly added CSS and/or a location of the newly added CSS.

Further, the second/third signaling is higher layer signaling or physical layer signaling. When the second/third signaling is physical layer signaling, the second/third signaling may be carried by a PDCCH/an ePDCCH, for example, the second/third signaling and signaling indicating an uplink-downlink subframe configuration share one PDCCH/ePDCCH.

The sending unit 302 is configured to send, to the UE, a PDCCH carrying uplink-downlink configuration information, where the PDCCH is a PDCCH in the first CSS.

Further, the sending unit 302 is further configured to send first signaling to the UE.

The first signaling carries configuration information of the first subframe set.

In this case, when the configuration information of the first subframe set includes an allocation period M and a subframe offset $n_{OFFSET}$, the configuration unit 301 is specifically configured to configure the first subframe set according to the allocation period M and the subframe offset $n_{OFFSET}$.

The subframe in the first subframe set satisfies $(10 \times n_f + n_{sbf} - n_{OFFSET}) \mod M = 0$, where $n_f$ represents a system frame number SFN, and $n_{sbf}$ represents a subframe number.

Further, the first signaling is higher layer signaling or physical layer signaling. When the first signaling is physical layer signaling, the first signaling may be carried by a PDCCH/an ePDCCH, for example, the first signaling and signaling indicating an uplink-downlink configuration share one PDCCH.

It should be noted that, the higher layer signaling is signaling from a higher layer and having a lower sending frequency relative to the physical layer signaling, where the higher layer signaling includes RRC signaling, MAC signaling, and the like.

Further, the sending unit 302 is further configured to send second signaling to the UE.

The second signaling is used to indicate a size of the first CSS and/or a location of the first CSS.

Alternatively, the sending unit 302 is further configured to send third signaling to the UE.

The third signaling is used to indicate a size of the newly added CSS and/or a location of the newly added CSS.

Figure 4:
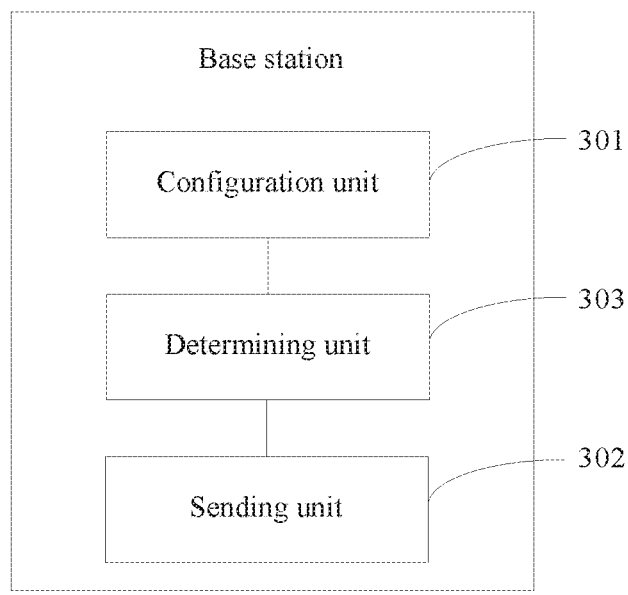
FIG. 4 is a schematic diagram of functions of another base station according to an embodiment of the present invention.

Further, as shown in FIG. 4, the base station further includes: a determining unit 303.

The determining unit 303 is configured to determine the PDCCH for carrying the uplink-downlink configuration information.

Specifically, the determining unit 303 is specifically configured to determine whether the reference CSS includes an idle PDCCH, where the idle PDCCH is a PDCCH that does not carry downlink control information DCI; and if it is determined that the reference CSS includes an idle PDCCH, determine that the PDCCH for carrying the uplink-downlink configuration information is the idle PDCCH; or if it is determined that the reference CSS does not include an idle PDCCH, determine that the PDCCH for carrying the uplink-downlink configuration information is a PDCCH in the newly added CSS.

Further, the configuration unit 301 is further configured to configure a first UESS in the subframe in the first subframe set.

Specifically, the configuration unit 301 is specifically configured to configure the first UESS according to a third preset rule or a maximum quantity of times of PDCCH blind detection of the UE.

The third preset rule is used to indicate a size and a location of the first UESS.

Further, the configuration unit 301 is specifically configured to: when the PDCCH carrying the uplink-downlink configuration information is the idle PDCCH in the reference CSS, configure that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8;

when the PDCCH carrying the uplink-downlink configuration information is the PDCCH in the newly added CSS, configure the first UESS according to the third preset rule; or when the PDCCH carrying the uplink-downlink configuration information is the PDCCH in the newly added CSS, configure the first UESS according to the maximum quantity of times of PDCCH blind detection of the UE.

Further, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes three candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

Further, the sending unit 302 is further configured to send fourth signaling to the UE.

The fourth signaling is used to indicate a size of the first UESS and/or a location of the first UESS.

Further, the fourth signaling is higher layer signaling or physical layer signaling. When the fourth signaling is physical layer signaling, the fourth signaling may be carried by a PDCCH/an ePDCCH, for example, the fourth signaling and signaling indicating an uplink-downlink subframe configuration share one PDCCH/ePDCCH.

This embodiment of the present invention provides a base station, where the base station configures a first CSS in a subframe in a first subframe set, determines, in the first CSS, a PDCCH for carrying uplink-downlink configuration information, and sends the PDCCH carrying the uplink-downlink configuration information. Because the first CSS is larger than a CSS specified in the prior art, a PDCCH for carrying uplink-downlink configuration information can surely be found, which ensures sending of the uplink-downlink configuration information, so that UE can acquire, in time, the uplink-downlink configuration information configured by the base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

Figure 5:
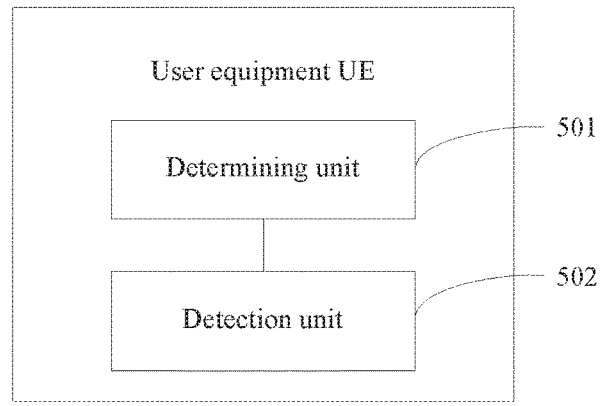
FIG. 5 is a schematic diagram of functions of user equipment UE according to an embodiment of the present invention.

As shown in FIG. 5, FIG. 5 is a schematic diagram of functions of user equipment UE according to an embodiment of the present invention. Referring to FIG. 5, the UE includes a determining unit 501 and a detection unit 502.

The determining unit 501 is configured to determine a first subframe set.

A subframe in the first subframe set is a downlink subframe or a special subframe.

Preferably, for a primary cell, the subframe in the first subframe set is a downlink subframe or a special subframe indicated in SIB1. For a secondary cell, the subframe in the first subframe set is a downlink subframe or a special subframe indicated in a Radio Resource Config Common SCell IE.

Optionally, the subframe in the first subframe set is a downlink subframe or a special subframe indicated in uplink-downlink configuration information carried by a PDCCH in a common search space.

Figure 6:
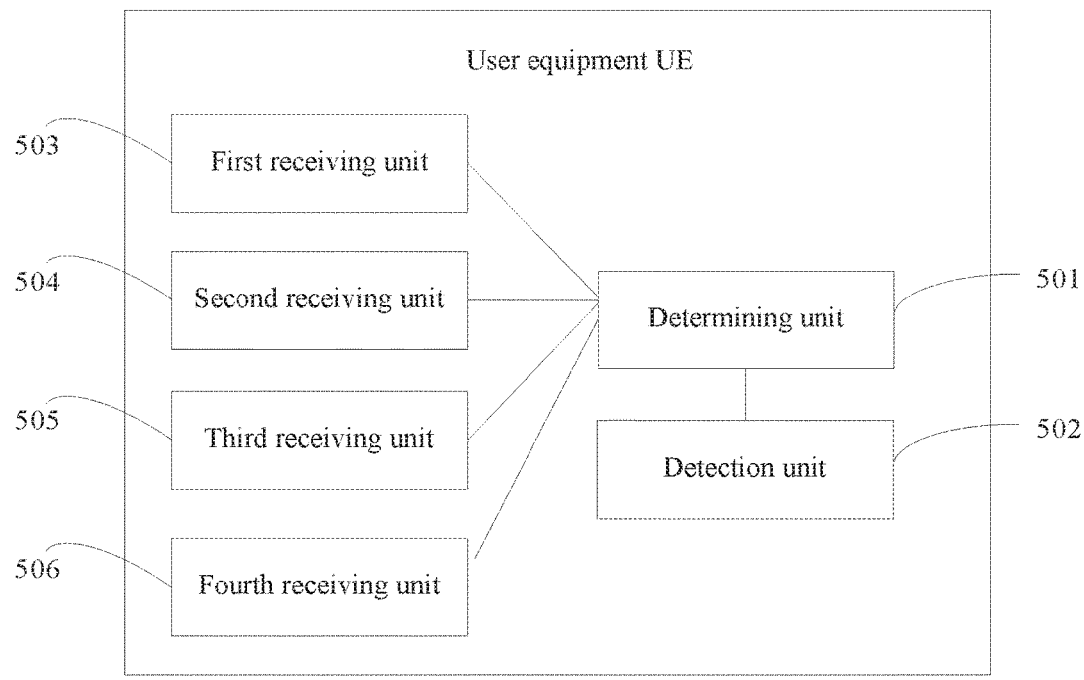
FIG. 6 is a schematic diagram of functions of another user equipment UE according to an embodiment of the present invention.

Further, as shown in FIG. 6, the UE further includes a first receiving unit 503.

The first receiving unit 503 is configured to receive first signaling sent by a base station.

The first signaling carries configuration information of the first subframe set.

In this case, the determining unit 501 is specifically configured to determine the first subframe set according to the first signaling received by the first receiving unit 503.

Further, the configuration information of the first subframe set includes an allocation period and a subframe offset. The determining unit 501 is specifically configured to determine the first subframe set according to the allocation period M and the subframe offset $n_{OFFSET}$.

The subframe in the first subframe set satisfies $(10 \times n_f + n_{sbf} - n_{OFFSET}) \bmod M = 0$, where $n_f$ represents a system frame number SFN, and $n_{sbf}$ represents a subframe number.

Further, the first signaling is higher layer signaling or physical layer signaling. When the first signaling is physical layer signaling, the first signaling may be carried by a PDCCH/an ePDCCH, for example, the first signaling and signaling indicating an uplink-downlink subframe configuration share one PDCCH/ePDCCH.

It should be noted that, the higher layer signaling is signaling from a higher layer and having a lower sending frequency relative to the physical layer signaling, where the higher layer signaling includes RRC signaling, MAC signaling, and the like.

The determining unit 501 is further configured to determine a first CSS in the subframe in the first subframe set.

The first CSS consists of L CCEs in a control area, where L is a positive integer greater than 16.

Specifically, the determining unit 501 is specifically configured to determine the first CSS according to a first preset rule.

The first preset rule is used to indicate a size and a location of the first CSS.

It should be noted that, the size refers to a quantity of CCEs, and the location refers to a start location of the CCEs.

Specifically, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

Alternatively, as shown in FIG. 6, the UE further includes a second receiving unit 504.

The second receiving unit 504 is configured to receive second signaling sent by the base station.

The second signaling is used to indicate a size of the first CSS and/or a location of the first CSS.

The determining unit 501 is specifically configured to determine the first CSS according to the second signaling received by the second receiving unit 504.

Further, the second signaling is higher layer signaling or physical layer signaling. When the second signaling is physical layer signaling, the second signaling may be carried by a PDCCH/an ePDCCH, for example, the second, signaling and signaling indicating an uplink-downlink subframe configuration share one PDCCH/ePDCCH.

Preferably, the first CSS includes a reference CSS and a newly added CSS.

It should be noted that, the reference CSS is a CSS defined in an existing LTE system. The reference CSS consists of the first 16 CCEs in the control area, including four candidate PDCCHs whose CCE aggregation level is 4 and two candidate PDCCHs whose CCE aggregation level is 8. The newly added CSS consists of extra N CCEs in the control area, where N is a positive integer greater than 1. The newly added CSS and the reference CSS may be continuously distributed or may be discontinuously distributed. Therefore, the first CSS consists of L CCEs in the control area, where L is a positive integer greater than 16.

In this case, the determining unit 501 is specifically configured to determine the reference CSS, and determine the newly added CSS.

The reference CSS consists of the first 16 CCEs in the control area. The newly added CSS consists of N CCEs in the control area, where N is equal to L−16, and the N CCEs do not include the first 16 CCEs in the control area.

Optionally, when CA and/or CoMP is configured for the UE, the determining unit 501 is specifically configured to determine that the first CSS consists of L control channel elements CCEs in the control area.

L is a positive integer greater than 16, that is, the first CSS includes a reference CSS and a newly added CSS, and the newly added CSS consists of N CCEs, where N is a positive integer greater than 1.

When CA and/or CoMP is not configured for the UE, the determining unit 501 is specifically configured to determine that the first CSS consists of 16 control channel elements CCEs in the control area, that is, the first CSS includes only a reference CSS, but does not include a newly added CSS.

Further, when the first CSS consists of L control channel elements CCEs in the control area, where L is a positive integer greater than 16, a method for determining, by the determining unit 501, the newly added CSS is as follows:

The determining unit 501 is specifically configured to determine the newly added CSS according to a second preset rule.

The second preset rule is used to indicate a size and a location of the newly added CSS.

Specifically, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

Alternatively, as shown in FIG. 6, the UE further includes a third receiving unit 505.

The third receiving unit 505 is configured to receive third signaling sent by the base station.

The third signaling is used to indicate a size of the newly added CSS and/or a location of the newly added CSS.

The determining unit 501 is specifically configured to determine the newly added CSS according to the third signaling received by the third receiving unit 505.

Further, the third signaling is higher layer signaling or physical layer signaling. When the third signaling is physical layer signaling, the third signaling may be carried by a PDCCH/an ePDCCH, for example, the third signaling and signaling indicating an uplink-downlink subframe configuration share one PDCCH/ePDCCH.

It should be noted that, the determining unit 501 may determine the reference CSS according to a method in the prior art, and details are not described herein again.

The detection unit 502 is configured to detect, in the first CSS determined by the determining unit 501, a PDCCH carrying uplink-downlink configuration information.

Specifically, the detection unit 502 is specifically configured to first detect, in the reference CSS, the PDCCH carrying the uplink-downlink configuration information, and determine whether the reference CSS includes the PDCCH carrying the uplink-downlink configuration information; and if it is determined that the reference CSS includes the PDCCH carrying the uplink-downlink configuration information, skip detecting, in the newly added CSS, the PDCCH carrying the uplink-downlink configuration information; or if it is determined that the reference CSS does not include the PDCCH carrying the uplink-downlink configuration information, detect, in the newly added CSS, the PDCCH carrying the uplink-downlink configuration information.

Further, the determining unit 501 is further configured to determine the first UESS in the subframe in the first subframe set.

Specifically, the determining unit 501 is specifically configured to determine the first UESS according to the third preset rule or a maximum quantity of times of PDCCH blind detection of the UE.

The third preset rule is used to indicate a size and a location of the first UESS.

Further, the determining unit 501 is specifically configured to: if it is determined that the reference CSS includes the PDCCH carrying the uplink-downlink configuration information, determine that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; if it is determined that the reference CSS does not include the PDCCH carrying the uplink-downlink configuration information, determine the first UESS according to the third preset rule; or when the PDCCH carrying the uplink-downlink configuration information is the PDCCH in the newly added CSS, configure the first UESS according to the maximum quantity of times of PDCCH blind detection of the UE.

Further, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, and the first UESS includes three candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

Alternatively, as shown in FIG. 6, the UE further includes a fourth receiving unit 506.

The fourth receiving unit 506 is configured to receive fourth signaling.

The fourth signaling is used to indicate a size of the first UESS and/or a location of the first UESS.

The determining unit 501 is specifically configured to determine the first UESS according to the fourth signaling received by the fourth receiving unit 506.

Further, the fourth signaling is higher layer signaling or physical layer signaling. When the fourth signaling is physical layer signaling, the fourth signaling may be carried by a PDCCH/an ePDCCH, for example, the fourth signaling and signaling indicating an uplink-downlink subframe configuration share one PDCCH.

This embodiment of the present invention provides UE, where the UE determines a first CSS in a subframe in a first subframe set, and receives, in the first CSS, a PDCCH carrying uplink-downlink configuration information. Because the first CSS is larger than a CSS specified in the prior art, a PDCCH for carrying uplink-downlink configuration information can surely be found, so that the UE can acquire, in time, the uplink-downlink configuration information configured by a base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

Figure 7:
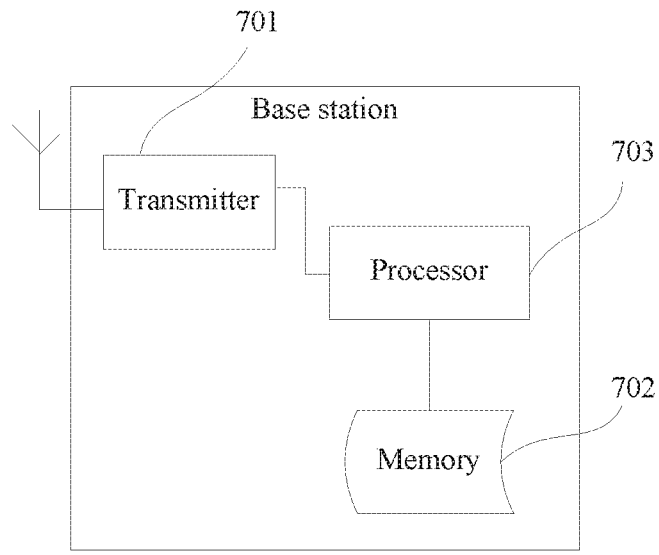
FIG. 7 is a schematic structural diagram of a base station according to an embodiment of the present invention.

As shown in FIG. 7, FIG. 7 is a schematic structural diagram of a base station according to an embodiment of the present invention. Referring to FIG. 7, the base station includes: a transmitter 701, a memory 702, and a processor 703 that is separately connected to the transmitter 701 and the memory 702.

A group of program code is stored in the memory 702, and the processor 703 is configured to invoke the program code stored in the memory 702. The transmitter 701 and the processor 703 are configured to perform the following operations:

The processor 703 is configured to configure a first subframe set.

A subframe in the first subframe set is a downlink subframe or a special subframe.

Because a special subframe includes a DwPTS that can be used for downlink data transmission, and a control area exists in the DwPTS, the subframe in the first subframe set may be a special subframe.

It should be noted that, the control area consists of a sequence of CCEs, and both a CSS and a UESS belong to the control area.

Preferably, for a primary cell, the subframe in the first subframe set is a downlink subframe or a special subframe indicated in system information block 1 SIB1; and for a secondary cell, the subframe in the first subframe set is a downlink subframe or a special subframe indicated in a common radio resource configuration information element of the secondary cell Radio Resource Config Common SCell IE.

Optionally, the subframe in the first subframe set is a downlink subframe or a special subframe indicated in uplink-downlink configuration information carried by a PDCCH in a common search space.

The processor 703 is further configured to configure a first CSS in the subframe in the first subframe set.

Preferably, the first CSS consists of L CCEs in the control area, where L is a positive integer greater than 16. The first CSS includes a reference CSS and a newly added CSS.

It should be noted that, the reference CSS is a CSS defined in an existing LTE system. The reference CSS consists of the first 16 CCEs in the control area, including four candidate PDCCHs whose CCE aggregation level is 4 and two candidate PDCCHs whose CCE aggregation level is 8. The newly added CSS consists of extra N CCEs in the control area, where N is a positive integer greater than 1. The newly added CSS and the reference CSS may be continuously distributed or may be discontinuously distributed. Therefore, the first CSS consists of L CCEs in the control area, where L is a positive integer greater than 16.

The processor 703 is specifically configured to configure the reference CSS, where the reference CSS consists of the first 16 CCEs in the control area; and configure the newly added CSS, where the newly added CSS consists of N CCEs in the control area.

N is equal to L−16, and the N CCEs do not include the first 16 CCEs in the control area.

Optionally, when CA and/or CoMP is configured for UE, the processor 703 is specifically configured to configure that the first CSS consists of L control channel elements CCEs in the control area.

L is a positive integer greater than 16, that is, the first CSS includes a reference CSS and a newly added CSS, and the newly added CSS consists of N CCEs, where N is a positive integer greater than 1.

When CA and/or CoMP is not configured for the UE, the processor 703 is specifically configured to configure that the first CSS consists of 16 control channel elements CCEs in the control area, that is, the first CSS includes only a reference CSS, but does not include a newly added CSS.

Further, when the first CSS consists of L control channel elements CCEs in the control area, where L is a positive integer greater than 16, there are three methods for configuring, by the processor 703, the first CSS, which are specifically as follows:

The processor 703 is specifically configured to configure the first CSS according to a first preset rule.

The first preset rule is used to indicate a size and a location of the first CSS.

Specifically, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

Alternatively, the processor 703 is specifically configured to configure the newly added CSS according to a second preset rule.

The second preset rule is used to indicate a size and a location of the newly added CSS.

It should be noted that, the size refers to a quantity of CCEs, and the location refers to a start location of the CCEs.

Specifically, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

It should be noted that, the processor 703 may configure the reference CSS according to a reference CSS configuration method in the prior art, and after finishing configuring the reference CSS, the processor 703 may configure the newly added CSS according to the second preset rule.

Alternatively, the processor 703 is specifically configured to configure the first CSS according to a requirement, and after configuring the first CSS, trigger the transmitter 701 to send second signaling to the UE. Alternatively, the processor 703 is specifically configured to configure the newly added CSS according to a requirement, and after configuring the newly added CSS, trigger the transmitter 701 to send third signaling to the UE.

The second signaling is used to indicate a size of the first CSS and/or a location of the first CSS. The third signaling is used to indicate a size of the newly added CSS and/or a location of the newly added CSS.

Further, the second/third signaling is higher layer signaling or physical layer signaling. When the second/third signaling is physical layer signaling, the second/third signaling may be carried by a PDCCH/an ePDCCH, for example, the second/third signaling and signaling indicating an uplink-downlink subframe configuration share one PDCCH/ePDCCH.

The transmitter 701 is configured to send, to the user equipment UE, a physical downlink control channel PDCCH carrying uplink-downlink configuration information, where the PDCCH is a PDCCH in the first CSS.

Further, the transmitter 701 is further configured to send first signaling to the UE.

The first signaling carries configuration information of the first subframe set.

In this case, when the configuration information of the first subframe set includes an allocation period M and a subframe offset $n_{OFFSET}$, the processor 703 is specifically configured to configure the first subframe set according to the allocation period M and the subframe offset $n_{OFFSET}$.

The subframe in the first subframe set satisfies $(10 \times n_f + n_{sbf} - n_{OFFSET}) \bmod M = 0$, where $n_f$ represents a system frame number SFN, and $n_{sbf}$ represents a subframe number.

Further, the first signaling is higher layer signaling or physical layer signaling. When the first signaling is physical layer signaling, the first signaling may be carried by a PDCCH/an ePDCCH, for example, the first signaling and signaling indicating an uplink-downlink configuration share one PDCCH.

It should be noted that, the higher layer signaling is signaling from a higher layer and having a lower sending frequency relative to the physical layer signaling, where the higher layer signaling includes RRC signaling, MAC signaling, and the like.

Further, the transmitter 701 is further configured to send second signaling to the UE.

The second signaling is used to indicate a size of the first CSS and/or a location of the first CSS.

Alternatively, the transmitter 701 is further configured to send third signaling to the UE.

The third signaling is used to indicate a size of the newly added CSS and/or a location of the newly added CSS.

The processor 703 is further configured to determine the PDCCH for carrying the uplink-downlink configuration information.

Specifically, the processor 703 is specifically configured to determine whether the reference CSS includes an idle PDCCH, where the idle PDCCH is a PDCCH that does not carry downlink control information DCI; and if it is determined that the reference CSS includes an idle PDCCH, determine that the PDCCH for carrying the uplink-downlink configuration information is the idle PDCCH; or if it is determined that the reference CSS does not include an idle PDCCH, determine that the PDCCH for carrying the uplink-downlink configuration information is a PDCCH in the newly added CSS.

Further, the processor 703 is further configured to configure a first UESS in the subframe in the first subframe set.

Specifically, the processor 703 is specifically configured to configure the first UESS according to a third preset rule or a maximum quantity of times of PDCCH blind detection of the UE.

The third preset rule is used to indicate a size and a location of the first UESS.

Specifically, the processor 703 is specifically configured to: when the PDCCH carrying the uplink-downlink configuration information is the idle PDCCH in the reference CSS, configure that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8;
  when the PDCCH carrying the uplink-downlink configuration information is the PDCCH in the newly added CSS, configure the first UESS according to the third preset rule; or
  when the PDCCH carrying the uplink-downlink configuration information is the PDCCH in the newly added CSS, configure the first UESS according to the maximum quantity of times of PDCCH blind detection of the UE.

Further, the third preset rule is used to indicate that the first CSS includes four candidate PDCCHs whose CCE aggregation level is 4 and three candidate PDCCHs whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or
  the third preset rule is used to indicate that the first CSS includes five candidate PDCCHs whose CCE aggregation level is 4 and three candidate PDCCHs whose CCE aggregation level is 8, and the first UESS includes four or five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or
  the third preset rule is used to indicate that when the first CSS includes six candidate PDCCHs whose CCE aggregation level is 4 and three candidate PDCCHs whose CCE aggregation level is 8, the first UESS includes three or four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or
  the third preset rule is used to indicate that when the first CSS includes six candidate PDCCHs whose CCE aggregation level is 4 and three candidate PDCCHs whose CCE aggregation level is 8, the first UESS includes four or five candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or
  the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or
  the third preset rule is used to indicate that the newly added CSS includes one candidate PDCCH whose CCE aggregation level is 4 and one candidate PDCCH whose CCE aggregation level is 8, and the first UESS includes four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or
  the third preset rule is used to indicate that when the newly added CSS includes two candidate PDCCHs whose CCE aggregation level is 4 and one candidate PDCCH whose CCE aggregation level is 8, the first UESS includes three candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or
  the third preset rule is used to indicate that when the newly added CSS includes two candidate PDCCHs whose CCE aggregation level is 4 and one candidate PDCCH whose CCE aggregation level is 8, the first UESS includes four candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

Further, the transmitter 701 is further configured to send fourth signaling to the UE.

The fourth signaling is used to indicate a size of the first UESS and/or a location of the first UESS.

Further, the fourth signaling is higher layer signaling or physical layer signaling. When the fourth signaling is physical layer signaling, the fourth signaling may be carried by a PDCCH/an ePDCCH, for example, the fourth signaling and signaling indicating an uplink-downlink subframe configuration share one PDCCH/ePDCCH.

This embodiment of the present invention provides a base station, where the base station configures a first CSS in a subframe in a first subframe set, determines, in the first CSS, a PDCCH for carrying uplink-downlink configuration information, and sends the PDCCH carrying the uplink-downlink configuration information. Because the first CSS is larger than a CSS specified in the prior art, a PDCCH for carrying uplink-downlink configuration information can surely be found, which ensures sending of the uplink-downlink configuration information, so that UE can acquire, in time, the uplink-downlink configuration information configured by the base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

Figure 8:
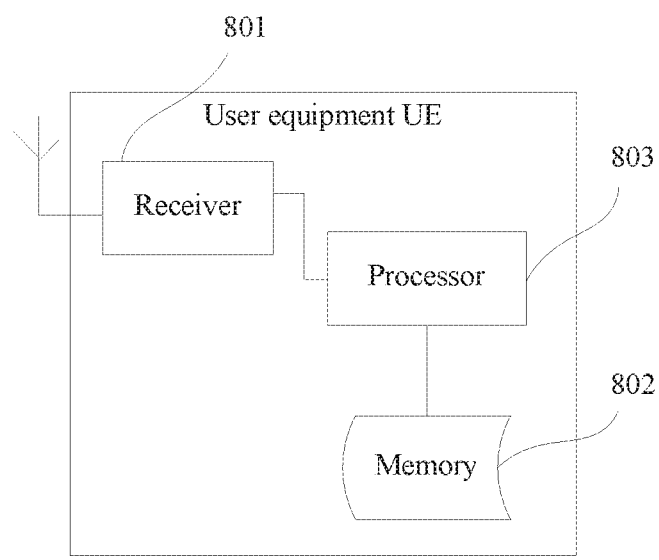
FIG. 8 is a schematic structural diagram of user equipment UE according to an embodiment of the present invention.

As shown in FIG. 8, FIG. 8 is a schematic structural diagram of user equipment UE according to an embodiment of the present invention. Referring to FIG. 8, the UE includes: a receiver 801, a memory 802, and a processor 803 that is separately connected to the receiver 801 and the memory 802.

A group of program code is stored in the memory 802, and the processor 803 is configured to invoke the program code stored in the memory 802. The receiver 801 and the processor 803 are configured to perform the following operations:

The processor 803 is configured to determine a first subframe set.

A subframe in the first subframe set is a downlink subframe or a special subframe.

Preferably, for a primary cell, the subframe in the first subframe set is a downlink subframe or a special subframe indicated in SIB. For a secondary cell, the subframe in the first subframe set is a downlink subframe or a special subframe indicated in a Radio Resource Config Common SCell IE.

Optionally, the subframe in the first subframe set is a downlink subframe or a special subframe indicated in uplink-downlink configuration information carried by a PDCCH in a common search space.

The receiver 801 is configured to receive first signaling sent by a base station.

The first signaling carries configuration information of the first subframe set.

In this case, the processor 803 is specifically configured to determine the first subframe set according to the first signaling received by the receiver 801.

Further, the configuration information of the first subframe set includes an allocation period and a subframe offset. The processor 803 is specifically configured to determine the first subframe set according to the allocation period M and the subframe offset $n_{OFFSET}$.

The subframe in the first subframe set satisfies $(10 \times n_f + n_{sbf} - n_{OFFSET}) \mod M = 0$, where $n_f$ represents a system frame number SFN, and $n_{sbf}$ represents a subframe number.

Further, the first signaling is higher layer signaling or physical layer signaling. When the first signaling is physical layer signaling, the first signaling may be carried by a PDCCH/an ePDCCH, for example, the first signaling and signaling indicating an uplink-downlink subframe configuration share one PDCCH/ePDCCH.

It should be noted that, the higher layer signaling is signaling from a higher layer and having a lower sending frequency relative to the physical layer signaling, where the higher layer signaling includes RRC signaling, MAC signaling, and the like.

The processor 803 is further configured to determine a first common search space CSS in the subframe in the first subframe set.

Preferably, the first CSS consists of L CCEs in a control area, where L is a positive integer greater than 16.

Optionally, when CA and/or CoMP is configured for the UE, the processor 803 is specifically configured to determine that the first CSS consists of L control channel elements CCEs in the control area.

L is a positive integer greater than 16, that is, the first CSS includes a reference CSS and a newly added CSS, and the newly added CSS consists of N CCEs, where N is a positive integer greater than 1.

When CA and/or CoMP is not configured for the UE, the processor 803 is specifically configured to determine that the first CSS consists of 16 control channel elements CCEs in the control area, that is, the first CSS includes only a reference CSS, but does not include a newly added CSS.

Further, when the first CSS consists of L control channel elements CCEs in the control area, where L is a positive integer greater than 16, the processor 803 is specifically configured to determine the first CSS according to a preset rule.

The first preset rule is used to indicate a size and a location of the first CSS.

It should be noted that, the size refers to a quantity of CCEs, and the location refers to a start location of the CCEs.

Specifically, the first preset rule is used to indicate that the first CSS includes four candidate PDCCHs whose CCE aggregation level is 4 and three candidate PDCCHs whose CCE aggregation level is 8; or the first preset rule is used to indicate that the first CSS includes five candidate PDCCHs whose CCE aggregation level is 4 and three candidate PDCCHs whose CCE aggregation level is 8; or the first preset rule is used to indicate that the first CSS includes six candidate PDCCHs whose CCE aggregation level is 4 and three candidate PDCCHs whose CCE aggregation level is 8.

Alternatively, the receiver 801 is configured to receive second signaling sent by the base station.

The second signaling is used to indicate a size of the first CSS and/or a location of the first CSS.

The processor 803 is specifically configured to determine the first CSS according to the second signaling received by the receiver 801.

Further, the second signaling is higher layer signaling or physical layer signaling. When the second signaling is physical layer signaling, the second signaling may be carried by a PDCCH/an ePDCCH, for example, the second signaling and signaling indicating an uplink-downlink subframe configuration share one PDCCH/ePDCCH.

Further, the first CSS includes a reference CSS and a newly added CSS.

It should be noted that, the reference CSS is a CSS defined in an existing LTE system. The reference CSS consists of the first 16 CCEs in the control area, including four candidate PDCCHs whose CCE aggregation level is 4 and two candidate PDCCHs whose CCE aggregation level is 8. The newly added CSS consists of extra N CCEs in the control area, where N is a positive integer greater than 1. The newly added CSS and the reference CSS may be continuously distributed or may be discontinuously distributed. Therefore, the first CSS consists of L CCEs in the control area, where L is a positive integer greater than 16.

In this case, the processor 803 is specifically configured to determine the reference CSS, and determine the newly added CSS.

The reference CSS consists of the first 16 CCEs in the control area. The newly added CSS consists of N CCEs in the control area, where N is equal to L−16, and the N CCEs do not include the first 16 CCEs in the control area.

Specifically, a method for determining, by the processor 803, the newly added CSS is as follows:

The processor 803 is specifically configured to determine the newly added CSS according to a second preset rule.

The second preset rule is used to indicate a size and a location of the newly added CSS.

Specifically, the second preset rule is used to indicate that the newly added CSS includes one candidate PDCCH whose CCE aggregation level is 8; or the second preset rule is used to indicate that the newly added CSS includes one candidate PDCCH whose CCE aggregation level is 4 and one candidate PDCCH whose CCE aggregation level is 8; or the second preset rule is used to indicate that the newly added CSS includes two candidate PDCCHs whose CCE aggregation level is 4 and one candidate PDCCH whose CCE aggregation level is 8.

Alternatively, the receiver 801 is configured to receive third signaling sent by the base station.

The third signaling is used to indicate a size of the newly added CSS and/or a location of the newly added CSS.

The processor 803 is specifically configured to determine the newly added CSS according to the third signaling received by the receiver 801.

Further, the third signaling is higher layer signaling or physical layer signaling. When the third signaling is physical layer signaling, the third signaling may be carried by a PDCCH/an ePDCCH, for example, the third signaling and signaling indicating an uplink-downlink subframe configuration share one PDCCH/ePDCCH.

It should be noted that, the processor 803 may determine the reference CSS according to a method in the prior art, and details are not described herein again.

The processor 803 is further configured to detect, in the first CSS, a physical downlink control channel PDCCH carrying uplink-downlink configuration information.

Specifically, the processor 803 is specifically configured to first detect, in the reference CSS, the PDCCH carrying the uplink-downlink configuration information, and determine whether the reference CSS includes the PDCCH carrying the uplink-downlink configuration information, and if it is determined that the reference CSS includes the PDCCH carrying the uplink-downlink configuration information, skip detecting, in the newly added CSS, the PDCCH carrying the uplink-downlink configuration information, or if it is determined that the reference CSS does not include the PDCCH carrying the uplink-downlink configuration information, detect, in the newly added CSS, the PDCCH carrying the uplink-downlink configuration information.

Further, the processor 803 is further configured to determine the first UESS in the subframe in the first subframe set.

Specifically, the processor 803 is specifically configured to determine the first UESS according to the third preset rule or a maximum quantity of times of PDCCH blind detection of the UE.

The third preset rule is used to indicate a size and a location of the first UESS.

Further, the processor 803 is specifically configured to: if it is determined that the reference CSS includes the PDCCH carrying the uplink-downlink configuration information, determine that the first UESS includes six candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; if it is determined that the reference CSS does not include the PDCCH carrying the uplink-downlink configuration information, determine the first UESS according to the third preset rule; or if it is determined that the reference CSS does not include the PDCCH carrying the uplink-downlink configuration information, configure the first UESS according to the maximum quantity of times of PDCCH blind detection of the UE.

The third preset rule is used to indicate that the first CSS includes four candidate PDCCHs whose CCE aggregation level is 4 and three candidate PDCCHs whose CCE aggregation level is 8, and the first UESS comprises five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the first CSS includes five candidate PDCCHs whose CCE aggregation level is 4 and three candidate PDCCHs whose CCE aggregation level is 8, and the first UESS includes four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes three candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the first CSS includes six candidate PDCCHs whose CCE aggregation level is 4 and three candidate PDCCHs whose CCE aggregation level is 8, the first UESS includes four candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 8, and the first UESS includes five candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that the newly added CSS includes one candidate PDCCH whose CCE aggregation level is 4 and one candidate PDCCH whose CCE aggregation level is 8, and the first UESS includes four candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, and the first UESS includes three candidate PDCCHs whose CCE aggregation level is 1, six candidate PDCCHs whose CCE aggregation level is 2, two candidate PDCCHs whose CCE aggregation level is 4, and two candidate PDCCHs whose CCE aggregation level is 8; or the third preset rule is used to indicate that when the newly added CSS includes two candidate PDCCHs whose CCE aggregation level is 4 and one candidate PDCCH whose CCE aggregation level is 8, the first UESS includes four candidate PDCCHs whose CCE aggregation level is 1, five candidate PDCCHs whose CCE aggregation level is 2, two candidate PDCCHs whose CCE aggregation level is 4, and two candidate PDCCHs whose CCE aggregation level is 8.

Alternatively, the receiver 801 is configured to receive fourth signaling.

The fourth signaling is used to indicate a size of the first UESS and/or a location of the first UESS.

The processor 803 is specifically configured to determine the first UESS according to the fourth signaling received by the receiver 801.

Further, the fourth signaling is higher layer signaling or physical layer signaling. When the fourth signaling is physical layer signaling, the fourth signaling may be carried by a PDCCH/an ePDCCH, for example, the fourth signaling and signaling indicating an uplink-downlink subframe configuration share one PDCCH.

This embodiment of the present invention provides UE, where the UE determines a first CSS in a subframe in a first subframe set, and receives, in the first CSS, a PDCCH carrying uplink-downlink configuration information. Because the first CSS is larger than a CSS specified in the prior art, a PDCCH for carrying uplink-downlink configuration information can surely be found, so that the UE can acquire, in time, the uplink-downlink configuration information configured by a base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

Figure 9:
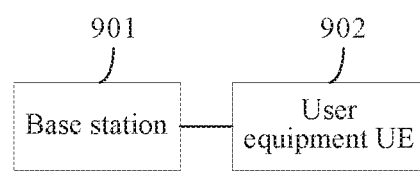
FIG. 9 is a schematic structural diagram of a system for configuring a search space according to an embodiment of the present invention.

An embodiment of the present invention provides a system for configuring a search space. As shown in FIG. 9, the system includes a base station 901 and user equipment UE 902, where the base station 901 is the base station in the foregoing embodiments; and the UE 902 is the UE in the foregoing embodiments.

The embodiments of the present invention provide a method, an apparatus, and a system for configuring a search space. A base station configures a first CSS in a subframe in a first subframe set, determines, in the first CSS, a PDCCH for carrying uplink-downlink configuration information, and sends the PDCCH carrying the uplink-downlink configuration information. Because the first CSS is larger than a CSS specified in the prior art, a PDCCH for carrying uplink-downlink configuration information can surely be found, which ensures sending of the uplink-downlink configuration information, so that UE can acquire, in time, the uplink-downlink configuration information configured by the base station. In addition, when the first subframe set is configured, a quantity of subframes in which the first CSS is configured can be reduced, which reduces a quantity of times of PDCCH blind detection in the CSS compared with when the first CSS is configured in all subframes. Correspondingly, a first UESS is further configured in the subframe in the first subframe set, where the first UESS is smaller than a UESS specified in the prior art, which ensures that a maximum quantity of times of PDCCH blind detection of the UE does not change, so that decoding complexity of the UE is not affected.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for configuring a search space, comprising:
   receiving, by a mobile device from a base station, a first signaling carrying configuration information of a first subframe set, wherein the configuration information of the first subframe set comprises an allocation period M and a subframe offset $n_{OFFSET}$;
   determining, by the mobile device, the first subframe set according to the allocation period M and the subframe offset $n_{OFFSET}$, wherein the subframe in the first subframe set satisfies: $(10 \times n_f + n_{sbf} - n_{OFFSET}) \mod M = 0$, wherein $n_f$ represents a system frame number (SFN), and $n_{sbf}$ represents a subframe number, wherein a subframe in the first subframe set is a downlink subframe or a special subframe;
   determining, by the mobile device, a first common search space (CSS) in the subframe in the first subframe set; and
   detecting, by the mobile device in the first CSS, a physical downlink control channel (PDCCH) carrying uplink-downlink configuration information.

2. The method according to claim 1, wherein the determining, by the mobile device, the first CSS comprises:
   receiving, by the mobile device, second signaling sent by the base station, wherein the second signaling is used to indicate a size of the first CSS; and
   determining, by the mobile device, the first CSS according to the second signaling.

3. The method according to claim 1, further comprising:
   determining, by the mobile device, a first user specific search space, (UESS) in the subframe in the first subframe set.

4. The method according to claim 3, wherein the determining, by the mobile device, the first UESS, comprises:
   receiving, by the mobile device, fourth signaling, wherein the fourth signaling is used to indicate a size of the first UESS; and
   determining, by the mobile device, the first UESS according to the fourth signaling.

5. A mobile device, comprising:
   a receiver configured to receive from a base station a first signaling carrying configuration information of the first subframe set, wherein the configuration information of the first subframe set includes an allocation period and a subframe offset;
   a processor, configured to:
      determine the first subframe set according to the allocation period M and the subframe offset $n_{OFFSET}$ received by the receiver, wherein the subframe in the first subframe set satisfies: $(10 \times n_f + n_{sbf} - n_{OFFSET}) \mod M = 0$, wherein $n_f$ represents a system frame number SFN, and $n_{sbf}$ represents a subframe number, wherein a subframe in the first subframe set is a downlink subframe or a special subframe;
      determine a first common search space (CSS) in the subframe in the first subframe set; and
      detect, in the first CSS, a physical downlink control channel (PDCCH) carrying uplink-downlink configuration information.

6. The mobile device according to claim 5, wherein the receiver is configured to receive second signaling sent by the base station, where the second signaling is used to indicate a size of the first CSS.

7. The mobile device according to claim 5, wherein the processor is configured to determining a first user specific search space, UESS, in the subframe in the first subframe set.

8. The mobile device according to claim 7, wherein the determining, by the processor, the first UESS, comprising:
   the receiver is configured to receive fourth signaling, where the fourth signaling is used to indicate a size of the first UESS; and
   determining, by the processor, the first UESS according to the fourth signaling.

9. A chipset, comprising:
   interface circuitry configured to receive from a base station a first signaling carrying configuration information of the first subframe set, wherein the configuration information of the first subframe set includes an allocation period and a subframe offset; and
   a processor configured to:
      determine the first subframe set according to the allocation period M and the subframe offset $n_{OFFSET}$ received by the interface circuitry, wherein the subframe in the first subframe set satisfies: $(10 \times n_f + n_{sbf} - n_{OFFSET}) \mod M = 0$, wherein $n_f$ represents a system frame number SFN, and $n_{sbf}$ represents a subframe number, wherein a subframe in the first subframe set is a downlink subframe or a special subframe;
      determine a first common search space, CSS, in the subframe in the first subframe set; and
      detect, in the first CSS, a physical downlink control channel PDCCH carrying uplink-downlink configuration information.

10. The chipset according to claim 9, wherein the interface circuitry is configured to receive second signaling sent by the base station, where the second signaling is used to indicate a size of the first CSS.

11. The chipset according to claim 9, wherein the processor is configured to determining a first user specific search space, UESS, in the subframe in the first subframe set.

12. The chipset according to claim 11, wherein the determining, by the processor, the first UESS, comprising:
   the interface circuitry is configured to receive fourth signaling, where the fourth signaling is used to indicate a size of the first UESS; and
   determining, by the processor, the first UESS according to the fourth signaling.

* * * * *

UNITED STATES PATENT AND TRADEMARK OFFICE
CERTIFICATE OF CORRECTION

PATENT NO. : 10,397,853 B2
APPLICATION NO. : 15/077366
DATED : August 27, 2019
INVENTOR(S) : Ma et al.

It is certified that error appears in the above-identified patent and that said Letters Patent is hereby corrected as shown below:

On the Title Page

Item (73), in Column 1, in "Assignee", Line 2, delete "LTD," and insert -- LTD., --, therefor.

In the Specification

In Column 1, Line 65, delete "subframe:" and insert -- subframe; --, therefor.

In Column 8, Line 44, delete "area:" and insert -- area; --, therefor.

In Column 16, Line 57, delete "8:" and insert -- 8; --, therefor.

In Column 23, Line 54, delete "Limes" and insert -- times --, therefor.

In Column 29, Line 58, delete "Lime" and insert -- time --, therefor.

In Column 39, Line 24, delete "Lime" and insert -- time --, therefor.

In Column 40, Line 7, delete "Optionally" and insert -- Optionally, --, therefor.

In Column 45, Line 41, delete "second," and insert -- second --, therefor.

In Column 53, Line 56, delete "SIB." and insert -- SIB1. --, therefor.

In Column 56, Line 3, delete "information," and insert -- information; --, therefor.

In Column 56, Line 7, delete "information," and insert -- information; --, therefor.

Signed and Sealed this
Fifth Day of December, 2023

Katherine Kelly Vidal
*Director of the United States Patent and Trademark Office*

CERTIFICATE OF CORRECTION (continued)
U.S. Pat. No. 10,397,853 B2

In the Claims

In Column 59, in Claim 5, Line 65, delete "offset;" and insert -- offset; and --, therefor.